United States Patent [19]

Kinoshita et al.

[11] Patent Number: 5,527,594
[45] Date of Patent: Jun. 18, 1996

[54] OPTICAL TAPE

[75] Inventors: Shinichi Kinoshita, Tokyo; Hidemi Yoshida, Atsugi; Kenichi Uchino, Tokyo, all of Japan

[73] Assignee: Diafoil Hoechst Company, Limited, Tokyo, Japan

[21] Appl. No.: 984,126

[22] Filed: Dec. 4, 1992

[30] Foreign Application Priority Data

| Dec. 4, 1991 | [JP] | Japan | 3-319524 |
| Dec. 24, 1991 | [JP] | Japan | 3-341496 |
| Dec. 27, 1991 | [JP] | Japan | 3-345959 |
| Jan. 6, 1992 | [JP] | Japan | 4-000281 |
| Mar. 4, 1992 | [JP] | Japan | 4-047078 |
| Mar. 19, 1992 | [JP] | Japan | 4-063747 |

[51] Int. Cl.$^6$ ........................ B32B 7/02
[52] U.S. Cl. .......... 428/212; 428/213; 428/409; 428/480; 428/694 SG; 428/336; 428/910; 428/141
[58] Field of Search ................ 428/206, 212, 428/213, 323, 409, 480, 694 TR, 694 BR, 694 SG, 910, 336, 141; 430/945

[56] References Cited

U.S. PATENT DOCUMENTS

| 4,508,782 | 4/1985 | Miura et al. | 428/409 |
| 4,546,030 | 10/1985 | Minami et al. | 428/220 |
| 4,590,119 | 5/1986 | Kawakami et al. | 428/216 |
| 4,761,327 | 8/1988 | Hamano et al. | 428/220 |
| 4,876,137 | 10/1989 | Utsumi | 428/141 |
| 5,047,278 | 9/1991 | Ono et al. | 428/141 |
| 5,082,730 | 1/1992 | Takeda et al. | 428/336 |
| 5,212,006 | 5/1993 | Shigeo | 428/141 |
| 5,271,985 | 12/1993 | Tsunashima et al. | 428/141 |

FOREIGN PATENT DOCUMENTS

| 176017 | 4/1986 | European Pat. Off. . |
| 331746 | 9/1989 | European Pat. Off. . |
| 57-33447 | 2/1982 | Japan . |
| 62-132251 | 6/1987 | Japan . |
| 1-286130 | 11/1989 | Japan . |
| 4-163737 | 6/1992 | Japan . |
| 4-163736 | 6/1992 | Japan . |
| 2091631 | 8/1982 | United Kingdom . |

OTHER PUBLICATIONS

Patent Abstracts Of Japan, vol. 10, No. 252 (C–369) (2308) 29 Aug. 1986 and JP–A–61 081 449, 25 Apr. 1986.
Database WPIL, Section Ch, Week 1991, Derwent Publications Ltd., London, GB; AN 91–135814 [19] and JP A–3 071 889, 27 Mar. 1991.
Database WPIL, Section Ch, Week 3190, Derwent Publications Ltd., London, GB; AN 90–234226 [31] and JP–A–2 160 552, 20 Jun. 1990.
Patent Abstracts Of Japan, vol. 16, No. 460 (P–1427) 24 Sep. 1992) and JP–A–41 63 737, 9 Jun. 1992.

*Primary Examiner*—Patrick J. Ryan
*Assistant Examiner*—Marie R. Yamnitzky
*Attorney, Agent, or Firm*—Foley & Lardner

[57] ABSTRACT

An optical tape comprising a substrate having a center line average roughness ($Ra^4$) on one side of 0.005 to 0.5 μm and a tensile strength ($F_5$) in the longitudinal direction of not less than 8 kg/mm$^2$, and an optical recording layer formed on the other side of said substrate.

40 Claims, No Drawings

OPTICAL TAPE

BACKGROUND OF THE INVENTION

The present invention relates to an optical tape which is capable of recording and reproducing information by the irradiation of light. More particularly, the present invention relates to an optical tape having notably improved recording and reproducing characteristics for information to be recorded.

Hitherto, magnetic recording media have been commonly used as information-recording tape. Recently, however, a request for improvement of information-recording density has been enlarged, and as an answer to such request, several types of optical tapes utilizing optical recording/reproducing systems have been proposed.

For example, Japanese Patent Application Laid-Open (Kokai) No. 57-33447(1982) discloses a tape obtained by coating a plastic base film with a Te—As—Se metal film so as to have about 1,000 Å in thickness and selectively forming the micropores in the metallic film by laser beams, and a tape obtained by coating the plastic base film with a mixture of carbon and nitrocellulose.

Japanese Patent Application Laid-Open (Kokai) No. 62-132251(1987) discloses an optical tape produced by depositing Te—Se alloys, Se—In—Sb alloys or Ag—Zn alloys on a polyimide base film by means of Re-magnetron sputtering, and further forming thereon a protective layer.

Also, in Japanese Patent Application Laid-Open (Kokai) No. 1-286130(1989) is disclosed an optical tape in which a magnetic layer is formed on one side of a base film and an anti-reflective layer is formed on the opposite side of the base film.

Various kinds of optical tapes such as mentioned above, have been proposed, but they involved the technical problems concerning the substrates. Each of the substrate used for the optical tapes had its own merits and demerits, and a substrate which is favorably put to practical use has not been available. For instance, it is preferable that the surface of the recording layer is as smooth as possible, but if the film surface is smooth, film-to-film slipperiness deteriorates, thereby encumbering commercialization of the optical tape.

Polyester film is excellent in chemical, mechanical and thermal properties, and also it is possible to obtain relatively easily a polyester film with a flat and smooth surface, so that polyester film is suited for use as a substrate of an optical tape. However, in the course of studies on manufacture of an optical tape by using such polyester film, it was found that the polyester film was incapable of putting to practical use to manufacture an optical tape because of poor slipperiness that is encountered in the polyester film-producing step and optical recording layer-forming step and in the optical tape-running system. Further, the optical tape obtained by using a smooth polyester film, due to poor slipperiness, would suffer many scratches causative of drop out on the film surface on the read-out side or on the recording layer surface, resulting in poor performance of the optical tape.

Some of the present inventors had proposed an optical tape capable of optical recording and reproducing information, the optical tape comprising a base film and a recording layer disposed on the base film, a center line average roughness on the surface of the base film, in which the recording layer is formed, being not more than 50 Å (Japanese Patent Application Laid-Open (Kokai) No. 4-163736).

Some of the present inventors had also proposed an optical tape capable of optical recording and reproducing information, the optical tape comprising a base film and a recording layer disposed on the base film through an intermediate layer, the center line average roughness on the surface of the intermediate layer, in which the recording layer is formed, being not more than 50 Å and the center line average roughness on the surface of the base film, which is opposite to the intermediate layer being 50 to 1,000 Å (Japanese Patent Application Laid-Open (kokai) No. 4-163737).

An optical tape having excellent durability and heat resistance in addition to excellent recording and reproducing performance has been earnestly desired.

As the results of the strenuous studies, it has been found that by using a substrate whose center line average roughness ($Ra^A$) on one side thereof is 0.005 to 0.5 μm and tensile strength ($F^5$) in the longitudinal direction (machine direction) is not less than 8 kg/mm², the obtained optical tape has excellent recording and reproducing performance as well as excellent durability and heat resistance. The present invention has been attained on the basis of this finding.

SUMMARY OF THE INVENTION

In a first aspect of the present invention, there is provided an optical tape comprising a substrate whose center line average roughness ($Ra^A$) on one side is 0.005 to 0.5 μm and a tensile strength ($F_s$) in the longitudinal direction is not less than 8 kg/mm², and an optical recording layer formed on the other side of the substrate.

In a second aspect of the present invention, there is provided an optical tape comprising a substrate whose center line average roughness ($Ra^A$) on one side (A) is 0.005 to 0.500 μm and center line average roughness ($Ra^B$) of the other side (B) is not more than 0.005 μm, a coefficient of dynamic friction between the side (A) and the side (B) being not more than 1.0, and an optical recording layer formed on the side (B) of the substrate.

In a third aspect of the present invention, there is provided an optical tape comprising a substrate composed of a polyester film having a center line average roughness (Ra) of not more than 0.05 μm, a coating layer (A) formed on one side thereof and a coating layer (B) formed on other side thereof, whose center line average roughness ($Ra^A$) on the surface of the coating layer (A) is 0.006 to 0.500 μm and center line average roughness ($Ra^B$) on the surface of the coating layer (B) is not more than 0.005 μm, a tensile strength ($F_s$) of the substrate being not less than 8 kg/mm², and an optical recording layer formed on the surface of the coating layer (B) of the substrate.

In a fourth aspect of the present invention, there is provided an optical tape comprising a substrate composed of a polyester film and coating layers formed on both sides thereof, the change ratio of a film haze (ΔH) of the substrate, represented by the following formula being not more than 3%, and an optical recording layer formed on one side of the substrate.

$$\Delta H = H_1 - H_0$$

(wherein $H_1$ represents a film haze after 30-minute heat-treatment at a temperature of 170° C., and $H_0$ represents a film haze at normal temperature before the heat-treatment)

In a fifth aspect of the present invention, there is provided an optical tape comprising a substrate whose center line average roughness ($Ra^A$) on one side (A) is 0.005 to 0.500

μm and center line average roughness ($Ra^B$) of the other side (B) is not more than 0.005 μm, the change ratio of a film haze (ΔH) of the substrate, represented by the following formula being not more than 3%, and an optical recording layer formed on one side of the substrate.

$$\Delta H = H_1 - H_0$$

(wherein $H_1$ represents a film haze after 30-minute heat-treatment at a temperature of 170° C. and $H_0$ represents a film haze at normal temperature before the heat-treatment)

In a sixth aspect of the present invention, there is provided an optical tape comprising a substrate having center line average roughness (Ra) of not more than 0.005 μm, an optical recording layer formed on one side of the substrate, and an antistatic layer formed on the other side of the substrate.

In a seventh aspect of the present invention, there is provided an optical tape comprising a substrate whose center line average roughness ($Ra^A$) on one side (A) is 0.005 to 0.500 μm and center line average roughness ($Ra^B$) of the other side (B) is not more than 0.005 μm, an optical recording layer formed on the surface of the side (B) of the substrate, and an antistatic layer formed on the surface of the side (A) of the substrate.

In an eighth aspect of the present invention, there is provided an optical tape comprising a substrate having a center line average roughness (Ra) of not more than 0.005 μm, an optical recording layer formed on one side of the substrate, and an antistatic layer laminated on the optical recording layer.

In a ninth aspect of the present invention, there is provided an optical tape comprising a substrate whose center line average roughness ($Ra^A$) on one side (A) is 0.005 to 0.500 μm and whose center line average roughness ($Ra^B$) of the other side (B) is not more than 0.005 μm, an optical recording layer formed on the side (B) of the substrate, and an antistatic layer laminated on the optical recording layer.

DETAILED DESCRIPTION OF THE INVENTION

As the substrate for the optical tape according to the present invention, there can be used, for instance, a polyester film, a polyester film having a coating layer formed on at least one side thereof, and a polyester film having a co-extruded polyester film on at least one side thereof.

The polyester in the polyester film of the substrate used in the present invention is polyethylene terephthalate in which not less than 80 mol % of the structural units are ethylene terephthalate, polyethylene naphthalate in which not less than 80 mol % of the structural units are ethylene naphthalate, or poly-1,4-cyclohexanedimethylene terephthalate in which not less than 80 mol % of the structural units are 1,4-cyclohexanedimethylene terephthalate.

As the other component materials than the said primary structural units, there can be used, for instance, diols such as diethylene glycol, propylene glycol, neopentyl glycol, polyethylene glycol and polytetramethylene glycol, dicarboxylic acids such as isophthalic acid, 2,6-naphthalenedicarboxylic acid, 5-sodiumsulfoisophthalic acid, adipic acid, azelaic acid, sebacic acid and their ester-forming derivatives, and oxymonocarboxylic acids such as oxybenzoic acid and its ester-forming derivatives.

Regarding at least one surface of the polyester film in the substrate used in the present invention, the smoother the better. The center line average roughness (Ra) of the polyester film is preferably not more than 0.05 μm, more preferably not more than 0.005 μm, still more preferably not more than 0.002 μm. If the center line average roughness (Ra) of the polyester film exceeds 0.05 μm, the optical recording performance may be deteriorated.

The polyester film used in the present invention may contain additive particles, deposited particles or catalyst residues for affording such surface properties to the film, but it is preferred to form the film with a polyester alone in order to form an optically smooth surface. The film may contain, if necessary, an antistatic agent, stabilizer, lubricant, crosslinking agent, anti-blocking agent, antioxidant, colorant, light shielding agent, UV absorber and other additives. It is also possible to blend other polymer(s) such as polyamide, polyolefin, polycarbonate, etc., in an amount not less than 10% by weight. However such polymer(s) should be added within range not greatly reducing crystallinity or extremely roughening of the film surface.

As the substrate used in present invention, whose center line average roughness ($Ra^A$) on the surface of the side opposite to the optical recording layer is 0.005 to 0.5 μm, the following ones may be exemplified.

(1) A polyester film having a coating layer (A) of a center line average roughness ($Ra^A$) of 0.005 to 0.5 μm.

(2) A polyester film having a thin polyester film (A) co-extruded therewith of a center line average roughness ($Ra^A$) of 0.005 to 0.5 μm.

(3) A polyester film of a center line average roughness ($Ra^A$) of 0.005 to 0.5 μm.

(1) A polyester film having a coating layer (A) of a center line average roughness ($Ra^A$) of 0.005 to 0.5 μm.

The coating layer (A) used in the present invention is composed of a resin binder and a lubricant. Although various known methods are usable for forming the coating layer, it is preferred to employ a method in which a lubricant and a resin binder are dispersed in water or an organic solvent to prepare a coating solution and the prepared coating solution is applied on the surface of the polyester film as a base film, and dried.

As the lubricant, particles, lubricating materials, and vertical protuberance-forming resins are usable.

As the particles usable as the lubricant in present invention, inorganic particles such as alumina, silica, titanium oxide, kaolin, molybdenum sulfide and the like; polymer particles such as polyester, polyamide, polyacrylate, polysulfone, polyphenylene oxide, polyimide, epoxy resin, crosslinked styrene resin, crosslinked acryl resin, crosslinked benzoguanamine resin, crosslinked melamine resin and the like; carbon particles; and particles of metallic alkoxide hydrolyzates may be exemplified. The average particles diameter thereof is preferably 0.01 to 5 μm, more preferably 0.03 to 1 μm, still more preferably 0.05 to 0.3 μm. If the particle size is too small, the particles tend to agglomerate with each other, thereby making it difficult to effect dispersion or to produce the desired lubricating effect. On the other hand, if the particle size is too large, it is difficult to disperse the particles and tends to cause fall-off of the particles from the coat. The shape of the particles may be spherical, oval or flat. Agglomerates of particles may be included.

The lubricating materials usable as the lubricant in present invention include anionic surfactants, cationic surfactants, ampholytic surfactants, noninonic surfactants, fluorine-based surfactants, organic carboxylic acids and their derivatives, higher aliphatic alcohols, paraffin, waxes, polyolefins, silicone compounds and the like. Of these materials, polyolefin or silicone compounds are preferred.

As the polyolefin lubricants, waxes, resins or rubber-like materials composed of a homopolymer or copolymer of 1-olefinic unsaturated monovalent hydrogen such as ethylene, propylene, 1-butene, 4-methyl-1-pentene, etc., for example, polyethylene, polypropylene, poly-1-butene, poly-4-methyl-1-pentene, ethylene-propylene copolymer, ethylene-1-butene copolymer, propylene-1-butene copolymer, etc.; aliphatic dicarboxylic acids such as azelaic acid, sebacic acid, etc.; and oxycarboxylic acids such as oxybenzoic acid and ester forming derivatives thereof may be exemplified.

As the silicone-compound lubricants, unmodified silicones such as dimethylpolysiloxane, and silicons modified with a polar group such as fatty acids, polyethers, alcohols, and alkyl group may be exemplified. Silicones modified with the polar group have good affinity for binder resins.

The "vertical protuberance-forming resins" refer to the compounds affecting a phase separation or stretching characteristics in the layer. Some methods of forming the protuberances by using these compounds are described below. In coextrusion method, a polyester and a polyolefin having poor affinity for the polyester are mixed and melt extruded, and the extruded sheet is stretched at least monoaxially. In coating method, a coating solution containing a water-soluble polymer such as, specifically, cellulose, gelatin, polyacrylic acid and its salts, polystyrenesulfonic acid and its salts, is coated on a polyester film in the course of the film forming process and the coated film is stretched. It is possible to employ other methods as well.

It is possible to use two or more of the said lubricants in admixture. Also, joint use of particles and lubricant materials, lubricant materials and vertical protuberances-forming resins, and vertical protuberances-forming resins and particles, is effective for the purpose of present invention.

The lubricant, when applied, is dispersed with a resin binder in water or an organic solvent.

The content of the lubricant in the coating layer is in the range of 0.5 to 40% by weight, preferably 1 to 20 % by weight. When the lubricant content is too small, the obtained coating layer (A) may not be provided with the desired slipperiness. On the other hand, when the lubricant content is too large, the coating film strength may lower.

As the resin binders used in the present invention, polyesters, polyamides, polystyrenes, polycarbonates, polyarylates, polyacrylates, polyvinyl chloride, polyvinylidene chloride, polyvinyl butyral, polyvinyl alcohol, phenoxy resins, polyimides, epoxy resins, polyurethanes, silicon resins, etc., and the copolymers of the monomers constituting the said resins and mixture thereof may be exemplified.

Among these resins, urethane resins, polyesters and resins using urethane resins or polyesters as a skeleton resin are preferable.

The urethane resins are composed of, for example, the following polyols, polyisocyanates, chain-lengthening materials and crosslinking agents.

As the polyols, polyethers such as polyoxyethylene glycol, polyoxypropylene glycol and polyoxytetramethylene glycol, polyesters such as polyethylene adipate, polyethylene-butylene adipate and polycaprolactone, acrylic polyols and castor oil may be exemplified.

As the polyisocyanates, tolylene diisocyanate, phenylene diisocyanate, 4,4'-diphenylmethane diisocyanate, hexamethylene diisocyanate, xylylene diisocyanate, 4,4-dicyclohexylmethane diisocyanate and isophorone diisocyanate may be exemplified.

Examples of chain-lengthening materials or crosslinking agents are ethylene glycol, propylene glycol, diethylene glycol, trimethylolpropane, hydrazine, ethylenediamine, diethylenetriamine, 4,4'-diaminophenylmethane, 4,4'-diaminodicyclohexylmethane and water.

As the components forming the polyesters, the following polycarboxylic acid and polyhydroxy compound may be exemplified.

As the polycarboxylic acid, telephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassium sulfoterephthalate, 5-sodium sulfoisophthalate, adipic acid, azelaic acid, sebacic acid, dodecanedicarboxylic acid, trimellitic acid, trimesic acid, trimellitic anhydride, phthalic anhydride, p-hydroxybenzoic acid, trimellitric acid monopotassium salt and the ester-forming derivatives thereof may be exemplified.

As the polyhydroxy compound, ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylene glycol, bisphenol A-ethylene glycol additives, diethylene glycol, triethylene glycol, polyethylene glycol, polypropylene glycol, polytetramethylene glycol, polytetramethyleneoxide glycol, dimethylolpropionic acid, glycerin, trimethylolpropane, sodium dimethylolethyl sulfonate and potassium dimethylolpropionate may be exemplified.

At least one compound is selected from each of the groups, and the selected compounds are synthesized by ordinary polycondensation to produce the polyesters.

The polyesters in the present invention also include composite high-molecular compounds having a polyester component such as an acrylic-grafting polyester and polyester polyurethane obtained by chain-lengthening a polyester polyol which are described in Japanese Patent Application Laid-Open (KOKAI) No. 1-165633(1989).

It is preferred in the coating solution used in the present invention that water is used as a medium from the viewpoint of safety and hygiene. The coating solution may also contain an organic solvent as an assistant of such resins within the scope of the present invention. When water is used as a medium, the coating solution may be obtained by forcibly dispersing such resin by a surfactant or the like, but it is preferably a self-dispersion-type resin having a hydrophilic nonionic component such as polyethers or a cationic group such as a quaternary ammonium salts, more preferably a water-soluble or water-dispersible resin having an anionic group.

The water-soluble or water-dispersible resin having an anionic group of the present invention is obtained by copolymerizing or grafting the said resin as a skeleton resin with compounds having an anionic group. As the anionic group, sulfonic acid, carboxylic acid, phosphoric acid and a salt thereof are preferable. In order to impart a water solubility to the resin, as the counter ions to the anionic group are used alkali.metal ions (lithium ion, sodium ion or potassium ion), or ammonium ion. The amount of anionic group in the water-soluble or water-dispersible resin having the anionic group is preferably 0.05 to 8 wt %. If the anionic group content is less than 0.05 wt % the water solubility or water dispersibility of the resin is sometimes lowered. On the other hand, if the anionic group content exceeds 8 wt %, the water resistance of the coating layer is sometimes lowered.

The polyesters of the water-soluble or water-dispersible resins used in the present invention are preferably polyesters having Tg of not more than 80° C., preferably 0° to 70° C.; more preferably polyesters having sulfonate ($-SO_3M$) group; still more preferably polyesters wherein an acidic moiety contains 1 to 10 mol % of sulfo aromatic dicarboxylic acid unit or salts thereof unit; most preferably polyesters wherein an acidic moiety contains 1 to 10 mol % of sulfoisophthalic acid unit or salts thereof unit.

The urethane resins of the water-soluble or water-dispersible resins used in the present invention are preferably urethane resins having carboxylic acid group (—COOH) or salts thereof as a hydrophilic group; more preferably urethane resins wherein a polyol moiety contains not less than 50 mol %, preferably not less than 70 mol % of polyester polyol unit; still more preferably urethane resins wherein a isocyanate moiety contains not less than 50 mol %, preferably not less than 70 mol % of aromatic diisocyanate unit and/or isophorone diisocyanate unit.

An amount of the resin binders in the coating layer is 50 to 99.5 wt %, preferably 60 to 90 wt %.

In order to improve the sticking property (blocking property), water resistance, solvent resistance and mechanical strength of the coating layer, the coating solution used in the present invention may contain, as crosslinking agent, methylol urea compounds, alkylol urea compounds, melamine compounds, guanamine compounds, acrylamide compounds, polyamide compounds, epoxy compounds, aziridine compounds, block polyisocyanates, silane coupling agents, titanium coupling agents, zirco-aluminate type coupling agents, peroxides, heat and light reactive compounds, photosensitive resins or the like.

The coating solution may further contain, if necessary, a defoaming agent, a coatability improving agent, a thickening agent, an antistatic agent, an organic lubricant, an antioxidant, an UV absorber, a foaming agent, a dye, a pigment and other additives.

As methods of applying the above-described coating solution to the polyester film, there are a method of applying the coating solution by using a reverse roll coater, gravure coater, rod coater, air doctor coater or another coating equipment as described in "Coating method" by Yuzi Harasaki, published by Maki Shoten, 1979, before, between or after the stretching steps, and a method of applying the coating solution by using the above-described coating equipment in the process of producing the biaxially stretched polyester film, is preferred. As a method of applying the coating solution in the process of producing the biaxially stretched polyester film, a method of applying the coating solution to an un-stretched polyester film and successively or simultaneously biaxially stretching the film; a method of applying the coating solution to a uniaxially stretched polyester film and stretching the resultant film in the direction perpendicular to the uniaxial direction; and a method of applying the coating solution to a biaxially stretched film and further stretching the resultant film in the transverse and/or machine direction(s) can be cited.

The stretching process is preferably carried out at a temperature of 60° to 130° C., and the stretching ratio is ordinarily at least 4 times, preferably 6 to 20 times as expressed by the area ratio. The stretched film is ordinarily heat-treated at a temperature of 150° to 250° C. It is also preferable to relax the stretched film by 0.2 to 20% in the machine and transverse directions in the maximum temperature zone of heat-treatment and/or the cooling zone at the exit of heattreatment. A more preferable method is a method of applying the coating solution to a uniaxially stretched polyester film stretched to 2 to 6 times at a temperature of 60° to 130° C. by roll stretching, stretching the resultant uniaxially stretched polyester film in the direction perpendicular to the previous stretching direction to 2 to 6 times at a temperature of 80° to 130° C. after appropriate drying or without such drying, and heat-treating the resultant biaxially stretched film at a temperature 150° to 260° C. for 1 to 600 seconds.

According to this method, it is possible to dry the coating layer simultaneously with the stretching of the substrate and make the thickness of the coating layer small in accordance with the stretching ratio of the film, so that it is possible to produce a film suitable as base material of a polyester film at a comparatively low cost.

The polyester film may be subjected to chemical treatment or discharging treatment before the coating solution is applied thereto in order to improve the coating property and the adhesiveness of the coating layer to the base film.

The thickness of the coating layer (A) is preferably 0.01 to 3 µm, more preferably 0.02 to 1 µm.

(2) A polyester film having a thin polyester film (A) co-extruded therewith of a center line average roughness ($Ra^A$) of 0.005 to 0.5 µm.

(2-1) The thin polyester film co-extruded with the polyester film as the base film is a co-extruded polyester film (A) containing a lubricant (lubricant layer (A)).

Any of the known pertinent methods can be used for forming the said lubricant layer, but a coextrusion process is preferred. The lubricant layer (A) whose a main constituent is a polyester, is preferred in view of reuse of the polyester film.

As the components of such a polyester, there can be used various polyvalent carboxylic acids and polyvalent hydroxyl compounds. As the polyvalent carboxylic acids, terephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassium sulfo terephthalic acid, 5-sodium sulfo isophthalic acid, adipic acid, azelaic acid, sebacic acid, dodecanedicarboxylic acid, glutaric acid, succinic acid, trimellitic acid, trimesic acid, trimellitic acid anhydride, phthalic anhydride, p-hydroxybenzoic acid, trimellitic acid monopotassium salts and their ester-forming derivatives may be exemplified. As the polyvalent hydroxyl compounds, ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylene glycol, bisphenol A-ethylene glycol additive, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate and potassium dimethylolpropionate may be exemplified.

One or more of the said carboxylic acids and one or more of the said hydroxyl compounds are selected and subjected to an ordinary polycondesation reaction, thereby obtaining a polyester.

The "polyesters" referred to in the present invention include the compounds having polyester units. As examples of the compounds having polyester units, the composite polymers such as polyester polyurethane obtained by chain-lengthening a polyester polyol with an isocyanate compound, polyester-polyacryl copolymer, etc., can be mentioned.

As the lubricant to be contained in the said polyester, the particles, the lubricating materials and the vertical protuberance-forming resins mentioned in (1) above can be mentioned. The average particle size of the lubricant particles is preferably 0.1 to 5 µm.

The lubricant content in the polyester is preferably 0.001 to 30 wt %, more preferably 0.005 to 10 wt %.

The thickness of the lubricant layer (A) of the substrate according to the present invention is usually 0.5 to 49.5 μm, preferably 1 to 15 μm.

(2-2) The co-extruded thin polyester film is one composed of a crystalline polyester.

The crystalline polyester used in the present invention is a polymer obtained by polycondensing an aromatic dicarboxylic acid such as terephthalic acid, naphthane-2,6-dicarboxylic acid or the like and an aliphatic glycol such as ethylene glycol, diethylene glycol, tetramethylene glycol, neopentyl glycol or the like. Typical examples of such polymers are polyethylene terephthalate (PET) and polyethylene-2,6-naphthalene dicarboxylate (PEN). As the crystalline polyester, homopolymers thereof as well as polymers obtained by copolymerizing other aromatic or aliphatic dicarboxylic acid with diol in an amount not affecting the crystallinity, for example, not more than 10 mol % preferably not more than 5 mol %. It is possible to blend other polymers such as polyamides, polyolefins, polycarbonates, etc., in an amount not more than 10 wt %. However, the blending amount should be made within limits not causing excessive deterioration of crystallinity or excessive roughening of the film surface.

The thickness of the co-extruded polyester film (A) is 0.5 to 49.5 μm, preferably 1 to 15 μm.

(3) A polyester film having a center line average roughness ($Ra^A$) on at least one side of 0.005 to 0.5 μm.

A polyester film having the surface of a center line average roughness ($Ra^A$) of 0.005 to 0.5 μm can be produced by the same methods as described in (2-1) and (2-2) above. It is, also, possible to obtain the polyester film by roughening the surface of a polyester film having a center line average roughness (Ra) of less than 0.005 μm by a conventional method such as a sand-blast processing, an emboss processing, a corona discharge-treatment, a plasma processing and a solvent treatment.

The center line average roughness ($Ra^A$) on the surface of the substrate of the optical tape according to the present invention is within the range of 0.005 to 0.5 μm, preferably 0.008 to 0.2 μm, more preferably 0.01 to 0.1 μm. When the $Ra^A$ is less than 0.005 μm, it is difficult that the slipperiness of the substrate is improved sufficiently, resulting in unsatisfactory workability of the substrate in wind-up and unwinding thereof. On the other hand, when the $Ra^A$ exceeds 0.5 μm, there may be induced adverse effects such as transfer of roughness to the smooth surface of the substrate.

(4) A substrate having a surface of a center line average roughness ($Ra^A$) of 0.005 to 0.5 μm thereon of the opposite side to the optical recording layer and a surface of a center line average roughness ($Ra^B$) of not more than 0.005 μm thereon of the optical recording layer side, and a coefficient of dynamic friction between both sides (A) and (B) of not more than 1.0.

A center line average roughness ($Ra^B$) on the surface of the optical recording layer side of the substrate is not more than 0.005 μm, preferably not more than 0.003 μm, and a center line average roughness ($Ra^A$) on the surface of another side (A) is within the range from 0.005 to 0.5 μm, preferably from 0.006 to 0.2 μm, more preferably from 0.007 to 0.1 μm. When the $Ra^B$ exceeds 0.005 μm, the optical recording performance may lower. When the $Ra^A$ is less than 0.005 μm, the slipperiness of the substrate is deteriorated, resulting in poor workability of the substrate, when worked into an optical tape or poor performance of the obtained optical tape. On the other hand, when the $Ra^A$ exceeds 0.5 μm, there may take place a transfer of roughness of the side (A) of the substrate to the side (B), so-called "offset phenomenon", causing deterioration of the optical tape performance.

In the present invention, the coefficient of dynamic friction between the surface (A) and surface (B) of the substrate is not more than 1.0, preferably not more than 0.9, more preferably not more than 0.8. When it exceeds 1.0, the handling workability of the substrate are deteriorated. Also, the side (B) of the substrate tends to suffer scratches to cause drop out.

The following methods can be cited for forming the surface with a center line average roughness ($Ra^B$) of not more than 0.005 μm.

(i) The polyester film as base film is produced so that the center line average roughness ($Ra^B$) of its surface become not more than 0.005 μm, or (ii) a coating layer (B) or a co-extruded polyester film (B) with a center line average roughness ($Ra^B$) of not more than 0.005 μm is formed on the polyester film as the base film.

(4-i) For affording the specified film surface property, namely a center line average roughness ($Ra^B$) on the surface of not more than 0.005 μm to the polyester film as the base film, it is especially preferred to use a polyester which is substantially free of the particles, although the presence of added particles, deposited particles and/or catalyst residues in the polyester may be contained. The term "substantially free of the particles" means that the particle content is not more than 0.05 wt %.

Preferred examples of the polyesters substantially free of the particles usable in present invention are the polyesters obtained by carrying out the polymerization by using an ester exchange catalyst such as a magnesium compound, manganese compound, zinc compound or the like, while preventing deposition of the catalyst residue by a phosphorus compound, and the polyesters obtained through direct polymerization without using an esterification catalyst. As the polymerization catalyst, there can be used an antimony compound, germanium compound, titanium compound, tin compound and the like. It is especially preferred to use a low-catalyst resin which has been polymerized by reducing the antimony content.

By subjecting the other surface of the substrate to the surface-roughening treatment described in (1) to (3) above, a surface of a center line average roughness ($Ra^A$) of 0.005–0.5 μm is formed.

(4-ii) On the surface of the other side of the substrate described in (1) to (3) above, a coating layer (B) having a center line average roughness ($Ra^B$) of not more than 0.005 μm, or a co-extruded polyester film (B) having a center line average roughness ($Ra^B$) of not more than 0.005 μm is formed.

The $Ra^A$ of the surface of the coating layer (A) is 0.005 to 0.500 μm, preferably 0.006 to 0.500 μm, more preferably 0.007 to 0.050 μm, still more preferably 0.008 to 0.020 μm. When the $Ra^A$ exceeds 0.500 μm, there may take place the transfer of roughness of the sliding surface to the recording layer side to deteriorate the optical recording performance, so-called "offset phenomenon".

The thickness of the coating layer (A) is usually in the range of 0.01 to 2 μm, preferably 0.02 to 1 μm. When the thickness is less than 0.01 μm, it is difficult to obtain a uniform coating layer. On the other hand, when the thickness exceeds 2 μm, the slipperiness of the substrate is deteriorated.

In the present invention, another coating layer (B) is disposed on the side opposite to the side with the coating layer (A). The coating layer (B) is disposed for enhancing an adhesion to the recording layer, especially under a high temperature and humidity environment, without impairing flatness of the substrate. This coating layer (B) can be formed, for example, by applying a coating solution in which a high-molecular weight compound such as used for the resin binder of the coating layer (A) is dissolved or finely dispersed in water or an organic solvent. In this case, it is preferable to use a high-molecular weight compound whose glass transition temperature (Tg) is lower than that of the polyester film as the base film, since the advantages of the present invention can be effectively attained by using such a high-molecular weight compound.

The Tg of the high-molecular weight compound used for the coating layer (B) of the present invention is usually not more than 70° C., preferably 0° to 60° C., more preferably 5° to 50° C. When the Tg of said compound is higher than 70° C., an adhesion to the recording layer, especially under a high temperature and humidity environment become weak. On the other hand, when the Tg of said compound is too low, the produced films may become subject to blocking and lowered in workability.

Of the above-mentioned high-molecular weight compounds usable for forming the coating layer (B), acrylic resins, urethane resins and polyesters are preferred. Among of them, urethane resins and polyesters are the most preferred.

The urethane resins are composed of, for example, the following polyols, polyisocyanates, chain-lengthening materials and crosslinking agents.

As the polyols, polyethers such as polyoxyethylene glycol, polyoxypropylene glycol and polyoxytetramethylene glycol, polyesters such as polyethylene adipate, polyethylene-butylene adipate and polycaprolactone, acrylic polyols and castor oil may be exemplified.

As the polyisocyanates, tolylene diisocyanate, phenylene diisocyanate, 4,4'-diphenylmethane diisocyanate, hexamethylene diisocyanate, xylylene diisocyanate, 4,4'-dicyclohexylmethane diisocyanate and isophorone diisocyanate may be exemplified.

Examples of chain-lengthening materials or crosslinking agents are ethylene glycol, propylene glycol, diethylene glycol, trimethylolpropane, hydrazine, ethylenediamine, diethylenetriamine, 4,4'-diaminophenylmethane, 4,4'-diaminodicyclohexylmethane and water.

As the components forming the polyesters, the following polycarboxylic acid and polyhydroxy compound may be exemplified.

As the polycarboxylic acid, telephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassium sulfoterephthalate, 5-sodium sulfoisophthalate, adipic acid, azelaic acid, sebacic acid, dodecanedicarboxylic acid, trimellitic acid, trimesic acid, trimellitic anhydride, phthalic anhydride, p-hydroxybenzoic acid, monopotassium trimellitate and the ester-forming derivatives thereof may be exemplified.

As the polyhydroxy compound, ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylyene glycol, bisphenol A-ethylene glycol additives, diethylene glycol, triethylene glycol, polyethylene glycol, polypropylene glycol, polytetramethylene glycol, polytetramethyleneoxide glycol, dimethylolpropionic acid, glycerin, trimethylolpropane, sodium dimethylolethyl sulfonate and potassium dimethylolpropionate may be exemplified.

At least one compound is selected from each of the groups, and the selected compounds are synthesized by ordinary polycondensation to produce the polyesters.

The polyesters in the present invention also include composite high-molecular compounds having a polyester component such as an acrylic-grafting polyester and polyester polyurethane obtained by chain-lengthening a polyester polyol which are described in Japanese Patent Application Laid-Open (KOKAI) No. 1-165633(1989).

It is preferred in the coating solution used in the present invention that water is used as a medium from the viewpoint of safety and hygiene. The coating solution may also contain an organic solvent as an assistant of such resins within the scope of the present invention. When water is used as a medium, the coating solution may be obtained by forcibly dispersing such resin by a surfactant or the like, but it is preferably a self-dispersion-type resin having a hydrophilic nonionic component such as polyethers or a cationic group such as a quaternary ammonium salts, more preferably water-soluble or water-dispersible high-molecular weight compounds (water-soluble or water-dispersible resins) having an anionic group.

The water-soluble or water-dispersible resin having an anionic group of the present invention is obtained by copolymerizing or grafting the high-molecular weight compounds as a skeleton resin with compounds having an anionic group. As the anionic group, sulfonic acid, carboxylic acid, phosphoric acid and a salt thereof are preferable. In order to impart a water solubility to the the high-molecular weight compounds, as the counter ions to the anionic group are used alkali metal ions (lithium ion, sodium ion or potassium ion), or ammonium ion. The amount of anionic group in the water-soluble or water-dispersible resin having the anionic group is preferably 0.05 to 8 wt %. If the anionic group content is less than 0.05 wt % the water solubility or water dispersibility of the high-molecular weight compounds is sometimes lowered. On the other hand, if the anionic group content exceeds 8 wt % the water resistance of the coating layer is sometimes lowered.

The polyesters of the water-soluble or water-dispersible resins used in the present invention are preferably polyesters having Tg of not more than 80° C., preferably 0° to 70° C.; more preferably polyesters having sulfonate ($-SO_3M$) group; still more preferably polyesters wherein an acidic moiety contains 1 to 10 mol % of sulfo aromatic dicarboxylic acid unit or salts thereof unit; most preferably polyesters wherein an acidic moiety contains 1 to 10 mol % of sulfo isophthalic acid unit or salts thereof unit.

The urethane resins of the water-soluble or water-dispersible resins used in the present invention are preferably urethane resins having carboxylic acid group ($-COOH$) or salts thereof as a hydrophilic group; more preferably urethane resins wherein a polyol moiety contains not less than 50 mol %, preferably not less than 70 mol % of polyester polyol unit; still more preferably urethane resins wherein a isocyanate moiety contains not less than 50 mol %, preferably not less than 70 mol % of aromatic diisocyanate unit and/or isophorone diisocyanate unit.

An amount of the resin binders in the coating layer (B) is 50 to 99.5 wt %, preferably 60 to 90 wt %.

In order to improve the sticking property (blocking property), water resistance, solvent resistance and mechanical strength of the coating layer, the coating solution used in the present invention may contain, as crosslinking agent, methylol urea compounds, alkylol urea compounds, melamine compounds, guanamine compounds, acrylamide compounds, polyamide compounds, epoxy compounds, aziridine compounds, block polyisocyanates, silane coupling agents, titanium coupling agents, zirco-aluminate type coupling agents, peroxides, heat and light reactive compounds, photosensitive resin or the like.

The coating solution may further contain, if necessary, a defoaming agent, a coatability improving agent, a thickening agent, an antistatic agent, an organic lubricant, an antioxidant, an UV absorber, a foaming agent, a dye, a pigment and other additives.

It is preferable that the coating layer (B) does not substantially contain any lubricant which may form a rough surface. It is rather preferred that the surface roughness of the said coating layer becomes lower than that of the polyester film. The above-described coating solution is applied on the polyester film as the base film to form the coating layer (B) in the same way as formation of the coating layer (A).

The $Ra^B$ of the surface of the coating layer (B) is not more than 0.005 μm, preferably not more than 0.003 μm. The thickness of the coating layer (B) is usually in the range of 0.01 to 1 μm, preferably 0.02 to 0.5 μm. When the thickness is less than 0.01 μm, it is difficult to attain an improvement of adhesiveness, and when the thickness exceeds 1 μm, the mechanical strength and heat resistance of the substrate may be lowered.

The coating layer (B) may comprise any number of laminations as far as the object of the present invention is fulfilled, but the center line average roughness ($Ra^B$) of its side contacting with the recording layer should be not more than 0.005 μm, preferably not more than 0.003 μm. When the $Ra^B$ exceeds 0.005 μm, the optical recording performance lowers.

In addition, the coating layer (B) is formed on the surface of the optical recording layer side of the substrate described in (2) and (3) by the same method as described above.

There is no doubt that the $Ra^A$ of the surface of the co-extruded polyester layer (A) is within the range of 0.005 to 0.500 μm, preferably 0.006 to 0.500 μm, more preferably 0.007 to 0.050 μm, still more preferably 0.008 to 0.020 μm. When the $Ra^A$ exceeds 0.500 μm, there may take place the transfer of roughness of the sliding surface to the recording layer side to deteriorate the optical recording performance, so-called "offset phenomenon".

The thickness of the co-extruded polyester layer (A) is usually in the range of 0.5 to 49.5 μm, preferably 1 to 15 μm. When the thickness is less than 0.5 μm, it is difficult to obtain a uniform thin film.

The $Ra^B$ of the co-extruded polyester layer (B) which is disposed on the surface of the optical recording layer side of the substrate is not more than 0.005 μm, preferably not more than 0.003 μm.

The thickness of the co-extruded polyester layer (B) is usually in the range of 0.5 to 49.5 μm, preferably 1 to 15 μm.

The thin polyester films (A) and (B) are co-extruded with the polyester film as the base film, thereby forming a laminated polyester film in which the thin polyester layer (A) disposed on one surface of the base film and the thin polyester layer (B) is disposed on another side thereof. Such polyester layer (B) is produced by co-extruding a polyester which is substantially free of the particles, although the presence of added particles, deposited particles and/or catalyst residues in the polyester may be contained. The term "substantially free of the particles" means that the particle content is not more than 0.05 wt %.

Preferred examples of the polyesters substantially free of the particles usable in the present invention are the polyesters obtained by carrying out the polymerization by using an ester exchange catalyst such as a magnesium compound, manganese compound, zinc compound or the like, while preventing deposition of the catalyst residue by a phosphorus compound, and the polyesters obtained through direct polymerization without using an esterification catalyst. As the polymerization catalyst, there can be used an antimony compound, germanium compound, titanium compound, tin compound and the like. It is especially preferred to use a low-catalyst resin which has been polymerized by reducing the antimony content.

In addition, the substrate in which the co-extruded thin polyester layer (B) has been formed on the optical recording layer side thereof by the same method as described above, is treated with the same method described in (1) and (3).

(5) A polyester film with a center line average roughness (Ra) of not more than 0.05 μm is used as base film, and a coating layer (B) or a co-extruded polyester film (B) is formed on surface of the the optical recording layer side of the said polyester film as the base film so as to afford the specified surface characteristic, viz. a center line average roughness ($Ra^B$) of not more than 0.005 μm, to the surface thereof. On the surface on the opposite side to the coating layer (B) or the co-extruded polyester film (B) on the polyester film as the base film, a coating layer (A) or a co-extruded polyester film (A) is formed to afford the specified surface characteristic, viz. a center line average roughness ($Ra^A$) of 0.005 to 0.5 μm.

The coating layers (A) and (B), and the co-extruded polyester films (A) and (B) can be formed by the same methods as described previously.

The polyester film as the base film is also produced in the same way as described above.

It is preferable that the surface of the polyester film as the base film used in present invention is smooth. The center line average roughness (Ra) on the surface of the polyester film as the base film is usually not more than 0.05 μm, preferably not more than 0.005 μm, more preferably 0.0005 to 0.002 μm. When the center line average roughness (Ra) of the polyester film exceeds 0.05 μm, it is difficult to form a smooth surface, even if applying a coating treatment such as mentioned below, and consequently the optical recording performance of the tape is deteriorated.

The polyester film as the base film of the present invention may contain the added particles, deposited particles or catalyst residues for affording the desired surface characteristics to the film, but is preferable to form the film with a polyester alone which is capable of forming an optically smooth surface. The polyester film may also contain, if necessary, an antistatic agent, stabilizer, lubricant, crosslinking agent, anti-.blocking agent, antioxidant, colorant, light shielding agent, UV absorber and other additives. Also, other polymer(s) such as polyamides, polyolefins, polycarbonates, etc. may be blended in an amount not more than 10 wt %. However such blending amount should be made within limits not causing excessive deterioration of crystallinity or excessive roughening of the film surface.

(6) A polyester film with a center line average roughness (Ra) of not more than 0.05 μm is used as base film, and a coating layer (A) or a co-extruded thin polyester film having an oligomers deposition-preventing property is formed on the said polyester film as the base film and containing a compound having an excellent oligomer deposition-preventing ability, or an oligomer deposition-preventing layer is formed on the coating layer (A) or a co-extruded thin polyester film (A).

The polyester film as the base film can be produced in the same way as described above.

Namely, the polyester film as the base film used in present invention may contain the added particles, deposited particles or catalyst residues, but it is preferred that a polyester film is formed with a polyester alone which is capable of forming an optically smooth surface.

If necessary, the polyester film as the base film may further contain other additives than the protuberance-forming agent, such as antistatic agent, stabilizer, lubricant, crosslinking agent, anti-blocking agent, antioxidant, colorant, light shielding agent, UV absorber, etc.

It is also possible to blend other polymer(s) such as polyamides, polyolefins, polycarbonates, etc., in an amount not more than 10 wt %. However such blending amount should be made within limits not causing excessive deterioration of crystallinity or excessive roughening of the film surface.

The polyester film as the base film used in the present invention is preferably subjected to an oligomer-reducing treatment since this treatment can decrease problems such as extraction of the low-molecular weight matter from the film edges or ply separation, thereby elevating the film reliability.

Such a base film can be obtained by, for example, the following known method. First, a polyester having an intrinsic viscosity of about 0.45 to 0.60 is prepared by carrying out a polycondensation reaction according to the ordinary melting method, and the obtained polyester is subjected to solid-phase polymerization in the form of chips. The solid-phase polymerization may be carried out either under a nitrogen stream or in vacua. Usually the solid-phase polymerization temperature is selected from the range of 190° to 250° C. and the reaction time is selected from the range of 5 to 30 hours. There can be accordingly obtained a polymer with intrinsic viscosity of about 0.7 to 0.9.

The polyester film is then stretched in the known way to obtain a biaxially stretched film. In this case, it is preferable to minimize the melt detention time.

For forming the coating layer or the co-extruded thin polyester film on the polyester film of the base film, the above-mentioned methods can be employed. It is preferred to properly select and incorporate such polymers or compounds to afford an oligomer deposition-preventing effect to the coating layer (A) or the co-extruded thin polyester film (A).

Among the polymers or compounds usable for the said purpose in the coating layer or the co-extruded polyester film, the followings have an especially excellent oligomer deposition-preventing ability:

(a) compounds capable of forming a crosslinked structure by heating or irradiating activation energy rays;

(b) heat-resistant resins having a glass transition temperature (Tg) of not more than 150° C.;

(c) acrylic resins;

(d) polyester resins; and (e) amide resins.

These polymers or compounds will be described in detail below.

(a) Compounds capable of forming a crosslinked structure by heating or irradiating activation energy rays:

The "compounds capable of forming a crosslinked structure by heating or irradiating activation energy rays" are curable polymers or compounds which are curable by heat, ultraviolet rays or radiations such as β-rays and γ-rays. As the curable polymers or compounds, xylene resins, melamine resins, sulfonamide resins, alkyd resins, epoxy resins, unsaturated polyesters and organometallic compounds may be exemplified. Among them, the organometallic compounds containing such metal as silicon, titanium, aluminum or the like are especially preferred for use in present invention.

These organometallic compounds are those which have at least one of chemical bonds such as metal-carbon bond, metal-alcoholate bond, metal-acylate bond, metal-chelate bond, etc., and which are capable of easily forming a polycondensate after hydrolysis in the presence or absence of a catalyst. As the metal, aluminum, silicon, titanium, chromium, zirconium and tin can be cited, but the use of other metals is possible. Among them, organosilane compounds or organotitanium compounds are especially preferred.

As the organosilane compounds usable in the present invention, tetraalkoxysilanes, trialkoxysilanes represented by the following formula (1) or (2), dialkoxysilanes and the compounds represented by the following formula (3) can be cited.

$$R^1-Si-(OR^2)_3 \qquad (1)$$

(2)

(wherein $R^1$ and $R^2$ represent independently $(C_1-C_{10})$alkyl group, $(C_3-C_{10})$cycloalkyl group, vinyl group, $(C_2-C_{10})$alkenyl group, aryl group, or any of these groups in which a part of the hydrogen atoms is substituted with other atom such as halogen or with a reactive functional group such as hydroxyl group, carboxyl group, epoxy group, epoxycyclohexyl group, glycidoxy group, methacryloxy group, amino group, diamino group, ureido group, mercapto group and the like; and $R^3$ represents an alkyl group such as methyl group, ethyl group, etc., or a substituted alkyl group such as methoxyethyl group)

$$(R^4)_{4-n}-Si-(R^5)_n \qquad (3)$$

(wherein $R^4$ represents $(C_1-C_{10})$alkyl group such as methyl group, ethyl group, propyl group, butyl group, etc., $(C_1-C_{10})$alkoxyl group such as methoxyl group, ethoxyl group, etc., vinyl group, phenyl group, methacryloxy group, methacryloxypropyl group and the like; $R^5$ represents a halogen, tert-butylperoxy group, acyl group or isocyanate group; and n is 1 to 4).

As these organosilane compounds, tetraethoxysilane, tetrabutoxysilane, methyltrimethoxysilane, methyltriethoxysilane, ethyltrimethoxysilane, methyltripropoxysilane, phenyltrimethoxysilane, dimethyldimethoxysilane, vinyltriethoxysilane, vinyltris(β-methoxyethoxy)silane, γ-chloropropyltrimethoxysilane, β-(3,4-epoxycyclohexyl)ethyltrimethoxysilane, γ-glycidoxypropyltrimethoxysilane, γ-glycidoxypropylmethyldiethoxysilane, γ-methacryloxypropyltrimethoxysilane, γ-aminopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, N-(benzyl)-β-(aminoethyl)-γ-aminopropyltrimethoxysilane, N-β-(aminoethyl)-β-(aminoethyl)-γ-aminopropyltrimethoxysilane, γ-ureidopropyltriethoxysilane, γ-mercaptopropyltrimethoxysilane, diethyldichlorosilane, n-propyltrichlorosilane, tetraisocyanatosilane, phenyltriisocyanatosilane and triisocyanatomethoxysilane may be exemplified. The organosilane compounds, however, are not restricted thereto.

Those of the above-mentioned organosilane compounds which are substituted with an amino group, such as γ-aminopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, N-β-(aminoethyl)-γ(aminoethyl)-γ-aminopropyltrimethoxysilane, N-(benzyl)-β-(aminoethyl)-γ-aminopropyltrimethoxysilane, etc., can be also favorably used in present invention.

As the organotitanium compounds usable in present invention, titanium esters, titanium acylates and titanium chelate compounds can be cited. More specifically, tetraisopropoxytitanium, tetrabutoxytitanium, tetrakis-(2-ethylhexyloxy)titanium, diisopropoxybis(acetylacetonato)titanium, tetrakis-(2-ethylhexanediortho)titanium, isopropoxytitanium tristearate and isopropoxytitanium tri(dioctylphosphate), may be exemplified. The organotitanium compounds, however, are not limited thereto.

In the present invention, these organometallic compounds are used either singly or as a mixture of two or more of them, partially hydrolyzed compounds, or low polymers of the hydrolyzate thereof.

(b) Heat-resistant resins having Tg of a temperature of not less than 150° C.:

As the heat-resistant resins suited for use in present invention, polysulfones, polyethersulfones, polyarylates, polyphenylene sulfide, polyether-imides, polyester-imides, polyamide-imides, polyimides, aramides, polybenzoimidazole and polyhydantoin may be exemplified. The heat-resistant resins, however, are not limited thereto.

In these resins, "polysulfones" are the polymers containing —$SO_2$— group in the main chain. Aromatic polysulfones are preferably used in view of heat resistance. These polysulfones have the following skeletal structure and may have a substituent:

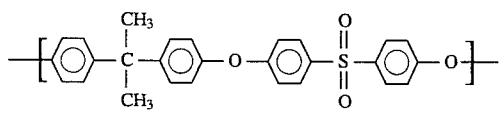

The "polyethersulfones" referred to above are also the polymers containing —$SO_2$— group in the main chain and having the following skeletal structure:

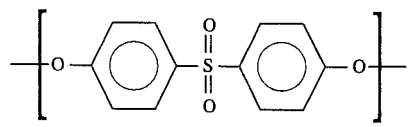

The "polyarylates" are the aromatic polyesters. The skeletal structure of the representative ones of these polyesters is as follows:

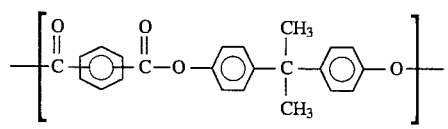

The "polyether-imides" are the polymers having both imide group and ether group in the main chain, and the skeletal structure of the representative ones of these polyether-imides is as follows:

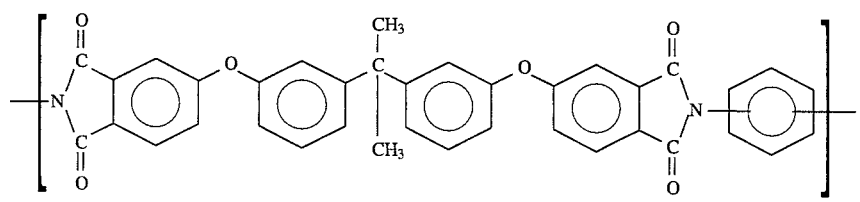

The "polyimide resins" are resins obtained by reacting at least one compound selected from the group consisting of aromatic tetrabasic acids, aromatic tribasic acids and their acid anhydrides, esters and acid halides, with at least one compound selected from the group consisting of aromatic diamines, aliphatic diamines, alicyclic diamines, aromatic diisocyanates, aliphatic diisocyanates and alicyclic diisocyanates. These resins are usually synthesized by using an acid anhydride.

Of these polyimides, the ones composed of an acid anhydride of an aromatic tetrabasic acid and a diamine or diisocyanate compound are preferred. Those of the polyimides which have been properly copolymerized for improving the coating properties of the coating solution and solubilizing the solvent, are especially preferred. The chemical structure of these polyimide resins is represented by the following formula:

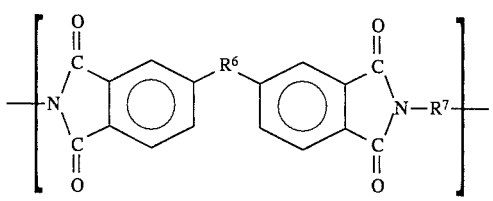

(wherein $R^6$ represents carbonyl group, epoxyl group or methylene group, and $R^7$ represents aromatic divalent hydrocarbon residues, aliphatic divalent hydrocarbon residues or alicyclic divalent hydrocarbon residues).

In order to make the polyimide soluble in solvents, a bond of a relatively flexible structure such as ether bond, sulfide bond, methylene bond or ethylene bond may be introduced into the main chain in order to facilitate a movement of the segments, or a substituent such as a methyl group or a halogen group may be introduced in order to lower stiffness of the molecules, thereby facilitating coating. In coating, the said compounds may be used either singly or as a mixture of two or more of them.

(c) Acrylic resins:

The homopolymers or copolymers of acrylic or methacrylic acids or their esters, and the copolymers of these monomers and the vinyl compounds such as styrene, acrylonitrile, etc., can be used. It is also possible to use the homopolymers or copolymers obtained from the said reactive monomers into which a glycidyl group, amino group or hydroxyl group has been introduced.

(d) Polyesters:

The polyesters synthesized by a polycondensation reaction of a polyvalent carboxylic acid and a polyvalent hydroxyl compound can be used. As the polyvalent carboxylic acids, terephthalic acid, isophthalic acid, orthophthalic acid, phthalic acid, 4,4'-diphenyldicarboxlic acid, 2,5-naphthalenedicarboxylic acid, 2,6-naphthalenedicarboxylic acid, 1,4-cyclohexanedicarboxylic acid, 2-potassium sulfo terephthalic acid, 5-sodium sulfo isophthalic acid, adipic acid, azelaic acid, dodecanedicarboxylic acid, glutalic acid, succinic acid, trimellitic acid, trimesic acid, trimellitic acid anhydride, phthalic anhydride, p-hydroxybenzoic acid, trimellitic acid monopotassium salt and their ester-forming derivatives may be exemplified. As the polyvalent hydroxyl compounds, ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylene glycol, bisphenol A-ethylene glycol additive, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, and potassium dimethylolpropionate may be exemplified.

The polyester resins usable in present invention include the compounds having polyester units. Typical examples of such compounds having polyester units are polyester polyurethane obtained by chain-lengthening the molecular chain of polyester polyol with an isocyanate compound, and the composite polymers such as polyesterpolyacryl copolymer.

(e) Amide resins:

Terpolymers of nylon 6, nylon 6/6, nylon 6/10, etc., and nylons obtained by oxymethylating nylon 6/6 with formaldehyde and further methoxylating it with methanol can be used.

The compounds of (a) to (e) described above can be used either singly or by as a mixture of two or more of them.

The coating layer or the co-extruded polyester layer used in present invention may contain crosslinking agents such as methylol ureas, alkylol ureas, melamines, guanamines, acrylamides or polyamides, epoxys, aziridines, block polyisocyanate, silane coupling agents, titanium coupling agents, zirco-aluminate type coupling agents, peroxides, heat and light reactive vinyl compounds or photosensitive resins for improving the oligomer deposition-preventing effect.

By forming the coating layer (A) or the co-extruded polyester layer (A) containing the polymers and/or compounds having the oligomer deposition-preventing ability by a suitable methods mentioned above, there can be obtained a substrate of an optical tape according to the present invention. In such a laminated substrate, it is preferable that the change ratio of film haze ($\Delta H$) represented by the following formula is not more than 3%. When the $\Delta H$ exceeds 3%, the recording performance of the obtained optical tape may be deteriorated.

$$\Delta H = H_1 - H_0$$

(wherein $H_1$ represents a haze of the substrate after 30-minute heat-treatment at a temperature of 170° C. and $H_0$ represents a haze of the substrate at normal temperature before the said heat-treatment.)

The thickness of the coating layer (A) or the co-extruded polyester layer (A) having an oligomer deposition-preventing property is usually in the range of 0.0001 to 10 μm, preferably 0.001 to 5 μm, more preferably 0.01 to 3 μm. If the thickness of the film is too small, it is difficult to attain the desired effect of preventing oligomer deposition. If the thickness is too large, the economical efficiency become poor and the various properties of the substrate tends to deteriorate. In the present invention, the coating layer or the co-extruded polyester layer may be composed of multiple-layers as far as the properties of the finally obtained substrate satisfies the requirements of the present invention.

In the coating layer (A) having an oligomer deposition-preventing property, the content of the polymers having the oligomer deposition-preventing ability in case of using the resin binder is 50 to 99.5 wt %, or the content of the compounds having the oligomer deposition-preventing ability is 50 to 99.5 wt %, the content of the lubricant is 0.5 to 40 wt %, the content of the crosslinking agent is not more than 40 wt % and the content of the surfactant is not more than 10 wt %.

In the co-extruded polyester film (A) having the oligomer deposition-preventing property, the content of the polyesters having the oligomer deposition-preventing ability is 50 to 99.5 wt %, the content of the lubricant is 0.5 to 40 wt % the content of the crosslinking agent is not more than 40 wt % and the content of the surfactant is not more than 10 wt %.

As the coating layer (B) or the co-extruded polyester film (B) described above, ones having the oligomer deposition-preventing ability may be used. The thickness of the coating layer (B) or the co-extruded polyester layer (B) having an oligomer deposition-preventing property is usually in the range of 0.0001 to 10 μm, preferably 0.001 to 5 μm, more preferably 0.01 to 3 μm. In the coating layer (B) having an oligomer deposition-preventing property, the content of the polymers having the oligomer deposition-preventing ability in case of using the resin binder is 50 to 100 wt %, the content of the compounds having the oligomer deposition-preventing ability is 50 to 100 wt % if necessary, the content of the crosslinking agent is not more than 40 wt % and the content of the surfactant is not more than 10 wt %. In the co-extruded polyester film (B) having the oligomer deposition-preventing property, the content of the polyesters having the oligomer deposition-preventing ability is 50 to 100 wt % the content of the crosslinking agent is not more than 40 wt %, and the content of the surfactant is not more than 10 wt %.

Also, coating layer or co-extruded polyester layer having the oligomer deposition-preventing property may be formed on the coating layer (B) or co-extruded polyester film (B).

The thickness of such coating layer or co-extruded polyester layer having an oligomer deposition-preventing property is usually in the range of 0.001 to 1 μm and 0.5 to 5 μm, respectively. In such coating layer having an oligomer deposition-preventing property, the content of the polymers having the oligomer deposition-preventing ability in case of using the resin binder is 50 to 100 wt % the content of the crosslinking agent is not more than 40 wt %, and the content of the surfactant is not more than 10 wt %. In such co-extruded polyester film having the oligomer deposition-preventing property, the content of the polyesters having the oligomer deposition-preventing ability is 50 to 100 wt % the content of the crosslinking agent is not more than 40 wt %, and the content of the surfactant is not more than 10 wt %.

(7-i) As the coating layer (A), ones composed of a resin binder, a lubricant and an antistatic agent is used; (7-ii) as the co-extruded polyester film (A), ones composed of a polyester, a lubricant and an antistatic agent is used; and (7-iii) a coating layer composed of a resin binder and an antistatic agent or a co-extruded polyester layer composed of a polyester and an antistatic agent is formed on the coating layer (A) or co-extruded polyester film (A).

(7-i & -ii) The thickness of the coating layer (A) or the co-extruded polyester layer (A) having the antistatic property is usually in the range of 0.0001 to 10 μm, preferably 0.001 to 5 μm, more preferably 0.01 to 3 μm. In the coating layer (A) containing the antistatic agent, the content of the resin binder is not more than 94.9 wt %, the content of the compounds having an antistatic ability is 5 to 99.9 wt % the content of the lubricant is 0.1 to 40 wt %, the content of the crosslinking agent is not more than 40 wt % and optionally, the content of the surfactant is not more than 10 wt %. In the co-extruded polyester film (A) having the antistatic property, the content of the polyesters is 60 to 95 wt %, the content of the compounds having an antistatic ability is 5 to 40 wt % and the content of the lubricant is 0.001 to 30 wt %, and optionally, the content of the surfactant is not more than 10 wt %.

(7-iii) The thickness of the coating layer or the co-extruded polyester layer having antistatic property and formed on the coating layer (A) or co-extruded polyester film (A) is usually in the range of 0.5 to 49.5 μm, preferably 1 to 15 μm. In such coating layer having the antistatic property, the content of the resin binder is not more than 94.9 wt %, the content of the compounds having an antistatic ability is 5 to 99.9 wt % and the content of the crosslinking agent is not more than 40 wt %. In such co-extruded polyester film (A) having the antistatic property, the content of the polyesters is 50 to 100 wt % and the content of the compounds having an antistatic ability is 5 to 40 wt %.

As the resin binder, lubricant, and polyesters, those described previously can be used.

As the crosslinking agent, there can be used, for instance, epoxy resins, amino-resins, isocyanate compounds, silane coupling agents, titanium coupling agents, zirco-aluminate coupling agents, aziridine compounds, etc.

In the coating layer having antistatic property, the surfactant blended in the antistatic layer is a compound added for maintaining uniformity of coating when it is formed by coating. Such a compound has a hydrophilic portion and a hydrophobic portion in the molecule. It can be properly selected from the generally known surfactants such as, for instance, sodium alkylbenzenesulfonate. As the surfactants, low-molecular weight compounds are preferred in the present invention since such surfactant functions as a lubricant and serves for stabilizing the tape run.

The antistatic agent used in the present invention is a compound having a greater electroconductivity than the polyester film used in the present invention, and it has the property to conduct and reduce the static electricity generated on the optical tape. This compound includes two types of an ion conductive-type compound and electron conductive-type compound.

The ion conductive-type compounds include compounds having a nonionic hydrophilic group such as polyethylene glycol, compound having a cationic group or an anionic group, and amphoteric compounds having both cationic and anionic groups in the molecule. Examples of these compounds are shown in "Latest Techniques of High-Molecular Weight Additives", pp. 257–274, C.M.C., Jan. 6, 1988, and "Coating Techniques", pp. 134–138, December, 1984, issue. Of course, the compounds having antistatic ability are, however, not limited thereto. As the compounds having an antistatic ability, compounds having a molecular weight not more than 1,000 are preferred for use in the present invention, since these compounds act for preventing adhesion of dust to the optical tape and for improving the running property of the tape. It is considered the fact that such antistatic agent plays the role of a lubricant and also is partly transferred to the optical recording layer side to improve, to some extent, the antistatic properties on this side of the tape, too.

Further, as the ion conductive compound, electrolytic (high-molecular weight) surfactants other than low-molecular weight surfactants may be cited.

(i) Sulfonic acid surfactants such as polystyrenesulfonic acid, origostyrenesulfonates, polypropylenesulfonic acid, polyvinylbutyralsulfonic acid, copolymer of styrenesulfonic acid and glycidyl methacrylate, copolymer of methacrylic acid and ethylenesulfonic acid.

(ii) Cationic high-molecular weight compounds such as polymers having a cationic nitrogen in the main chain described in EP 0 445 744 A, for example, an ionene polymer (Japanese Patent Application Laid-Open (KOKAI) Nos. 47-34581, 56-76451, 58-93710, 61-18750 and 63-68687), and polymers having pyrrolidon rings in the main chain described in U.S. Pat. No. 5,082,730.

As the electron conductive compounds usable as another antistatic component, organic electron conductive compounds and inorganic electron conductive compounds may be cited. As the organic compounds, conductive polymers, charge-transfer complexes and their analogies, for example the compounds such as shown in "New Conductive High-Molecular Weight Materials", C.M.C., Feb. 5, 1987, and "Coating Techniques", pp 134–138, December 1984, may be exemplified.

As the organic semiconductive antistatic compounds usable as the electron conductive compound, the following compounds may be exemplified.

(i) π electron-type compounds:
(a) Polycyclic π electron-type compounds such as polycyclic aromatic compounds, phthalocyanine, polyphthalocyanine, heat-treated resins.
(b) Linear conjugated π electron-type compounds such as carotenes, acetylene copolymers.

(ii) Intermolecular compounds:
Charge-transfer-type intermolecular compounds such as $TTF^+ \cdot TCNQ^-$, $Q^+ \cdot (TCNQ_2)^-$, and $(TMTTF_2)^+ \cdot X^-$, wherein TTF represents the following formula:

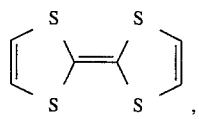

TCNQ represents the following formula:

TMTTF represents the following formula:

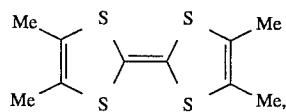

$Q^+$ represents pyridinium, quinolinium, N-methyl quinolinium, N-n-propyl quinolinium, N-methyl phenadinium, 2,2'-bispyridinium,

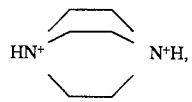

$(C_2H_5)_3N^+H$, $CH_3P^+ph_3$ and $S^+ph_3$, and $X^-$ represents $ASF_6^-$, $BF_4^-$, $ClO_4^-$ and halogen ion.

The "inorganic compounds" are the conductive metals or metal compounds such as conductive ITO, $SnO_2$ and CuS.

The surface resistivity of the layer having an antistatic property in the optical tape according to the present invention is preferably not more than $1 \times 10^{12}$ Ω/□. When the surface resistivity is more than $1 \times 10^{12}$ Ω/□, the antistatic performance is reduced and it becomes difficult to eliminate the various troubles caused by static electricity. The surface resistivity of the antistatic layer is more preferably not more than $1 \times 10^{10}$ Ω/□, still more preferably not more than $1 \times 10^8$ Ω/□. When the surface resistivity is not more than $10^8$ Ω/□, the static electricity disappears in a moment, and thus static electricity is, practically, not generated.

(8) An antistatic layer is formed on the optical recording layer for preventing charging of static electricity.

The antistatic layer on the optical recording layer is composed of a resin binder, fine particles, a surfactant and an antistatic agent.

The binder used in the antistatic layer is an organic polymer applied for affording a strength to the film. As the organic polymers usable for the said purpose, acrylic polymers, polystyrenes, polyesters, polyurethanes, polyolefins, polyvinyl acetate, polyvinyl chloride, polyvinylidene chloride, styrenebutadiene rubber, acrylonitrile-butadiene rubber, and random, block or graft copolymers of monomers constituting the said polymers may be exemplified.

As the crosslinking agent used in the antistatic layer, those described above can be used.

As the antistatic agent used in the antistatic layer, those described above can be used.

The fine particles used in the antistatic layer may be those of either organic or inorganic.compounds. For instance, there can be used the organic fine particles such as particles of polystyrene-divinylbenzene copolymer, fine particles of crosslinked acrylic polymers, fine particles of polysiloxanes, fine particles of fluorine polymers, fine particles of aminoresins, fine particles of polybenzoguanamine, and the like. As the inorganic particles, there can be used the fine particles of silica, alumina, calcium carbonate and all kinds of inorganic compounds. These fine particles form a fine unevenness on the film surface, thereby affording an appropriate slipperiness and anti-block properties. However, the size and content of these particles should be within limits not affecting any adverse effect to the optical surface characteristics of the optical tape. When the particle size is too large or the particle content is too high, the passage of light through the optical tape in writing or reading is disturbed.

As the surfactant used in the antistatic layer, those mentioned above can be employed. It is, however, preferred to use a compound having a molecular weight not less than 1,000. A compound with a low molecular weight has the possibility to disperse away when optical recording or reading is made with laser light.

For forming an antistatic layer on the optical recording layer side of the optical tape, a solution or dispersion containing the said compound may be applied, or a PVD or CVD method may be employed as dry process. It is preferred to form the lamination with an inorganic compound by vacuum deposition or sputtering. As for the method of applying the coating solution, it is possible to employ the methods shown in Y. Harasaki: Coating Systems, Maki Shoten, 1979.

In the present invention, the antistatic layer may be multi-layered as far as the properties are, finally, not impaired.

The thickness of the antistatic layer is preferably not more than 1,000 Å, more preferably 10 Å to 500 Å. If the layer thickness is too large, unevenness of thickness tends to enlarge. Consequently, refraction and scatter of light become unneglible, and the resulting variation of reflectance may cause drop out. Of course, if it is possible to diminish unevenness of thickness of the antistatic layer, there arises no problem even if the layer thickness is not less than 1,000 Å.

In the said antistatic layer, the content of the resin binder is not more than 95 wt % the content of the fine particles is not more than 40 wt %, the content of the compounds having an antistatic ability is 5 to 100 wt %, and optionally the content of the surfactant is not more than 10 wt %.

The thickness of the polyester film as the base film used in the present invention is not limited, but its practical thickness is in the range of 3 to 50 μm, preferably 4 to 50 μm, more preferably 5 to 30 μm. When the film thickness is too small, the film lacks strength for practical use.

An $F_5$ in the longitudinal direction of the substrate used in the present invention is preferably not less than 8 kg/mm$^2$, more preferably not less than 9 kg/mm$^2$, still more preferably not less than 10 kg/mm$^2$. When the $F_5$ of the substrate in its longitudinal direction is less than 8 kg/mm$^2$, the obtained optical tape may prove unsatisfactory in durability.

The heat shrinkage of the substrate in its longitudinal direction (machine direction) after 30 minute heat-treatment at a temperature of 100° C. is preferably not more than 5%, more preferably not more than 3%, still more preferably not more than 2%. In case such heat shrinkage exceeds 5%, the heat resistance may become unsatisfactory thereby adversely affecting the properties of the produced optical tape.

As the optical recording layer formed on the base film in the present invention, any of a write-once recording layer capable of recording only for once and an erasable recording layer capable of repeating erasing can be used. As the erasable type, a magneto-optic recording medium utilizing a magneto-optic effect or a phase-transfer medium utilizing a reversible transfer of the state of crystallization can be mentioned. The optical recording layer of the present invention is composed of a dielectric layer, a recording layer and a reflective layer. The erasable recording media comprise a layer constitution of substrate/dielectric layer/recording layer/dielectric layer/reflecting layer in the case of conducting the recording/reproducing of information by the irradiation of laser beam on the side of the base film, or comprise a layer constitution of substrate/reflecting layer/dielectric layer/recording layer/dielectric layer in the case of irradiating the laser beam on the side of the optical recording layer.

The dielectric layer is used for a purpose of protecting a recording layer from a ready oxidization by moisture or oxygen and for a purpose of preventing a deformation of the recording layer, and usually, a transparent and high heat-resistant metal oxide, metal nitride, metal sulfide, inorganic carbide, etc. may be used.

As the metal oxide, metal oxides such as $Al_2O_3$, $Ta_2O_5$, SiO, $SiO_2$ and a mixture thereof, and composite oxides such as Al—Ta—O may be exemplified. Further, to the above-mentioned compounds, other elements, for example, Ti, Zr, Mo and Y in the form of an oxides alone or in combination with Al or Ta may be added. Since such metal oxides have a dense structure, they can prevent an infiltration of moisture or oxygen from the outside, have a high corrosion-resistance, and are less reactive with the magneto-optical recording layer or the phase transfer recording layer and excellent in adhesion with the resin.

As the metal nitrides, nitrides of metals such as Si, Al and Ge, composite nitrides of two or more of them and composite oxides thereof with Nb and Ta (for example, SiNbN, SiTaN) may be exemplified. Among them, Si-containing nitrides show more excellent effect. The metal nitrides are dense, can prevent an infiltration of moisture or oxygen from the outside and have a high corrosion-resistance.

As the metal sulfides, ZnS and a mixture with the above-mentioned metal oxide or metal nitride may be exemplified.

As the inorganic carbides, SiC or the like can be mentioned.

In the present invention, tantalum oxide ($Ta_2O_5$) and zinc sulfide (ZnS) are more preferred since they cause less cracking.

A preferred film thickness of the dielectric layer is about from 500 to 3,000 Å for the dielectric layer on the side of the substrate and about 100 to 3,000 Å on the side of the reflecting layer (outer side).

For the recording layer, there can be used alloys of rare earth elements and transition metals, for example, magneto-optical recording materials such as TbFeCo, GdTbFe, GdTbFeCo, GdDyFeCo and NdDyFeCo or phase-transfer recording materials such as Ge—Te materials, Ge—Sb—Te materials and In—Sb—Te materials.

The film thickness of the recording layer is preferably within a range from 100 to 2,000 Å.

The film thickness of the recording layer and the dielectric layer is selected so that the absorption efficiency for the laser beam is high, and the amplitude of recording signals, that is, the contrast between the recording state and the unrecording state is increased in view of the interference effect caused by multilayered constitution.

As the reflecting layer, a thin film of metal such as Al, Au, Ag and Ni having a high reflectance is usually used. The reflecting layer also has an effect of promoting the diffusion of heat-energy absorbed in the recording layer. The film thickness of the reflecting layer is preferably within a range from 200 to 3,000 Å. Further, a resin protecting layer composed of a UV-ray curable resin may be formed on the reflecting layer.

The recording layer, dielectric layer and reflecting layer are formed by a known vacuum thin-film forming method, for example, a vacuum-vapor deposition method, ion plating method or sputtering method. The sputtering method is recommended, particularly, with a view point of easy control of the composition and film thickness. The thickness of the recording layer or the like to be formed can be controlled by monitoring using a film thickness guage such as a quartz oscillator as a known technique.

An optical tape having a back-coating layer disposed by a known means on the side of the optical recording medium opposite to the vapor deposition surface thereof is more preferred. As the material of the back-coating layer, ones described in Japanese Patent Application Laid-Open (KOKAI) No. 62-245523 may be used.

The back-coating layer may be formed before the formation of the optical recording layer, but it is more preferable to form the layer after the formation of the optical recording layer.

The optical tape of the present invention is excellent slipperiness, durability and heat resistance. Accordingly, the optical tape of the present invention shows a very low drop-out characteristic and a notably improved recording and reproducing characteristics for an information to be recorded.

EXAMPLES

The present invention will hereinafter be described in further detail by showing the examples. It is to be understood, however, that these examples are merely intended to be illustrative and not to be construed as limiting the scope of the invention.

The evaluation methods employed in the Examples are as described below. In the following Examples and Comparative. Examples, all "parts" are "parts by weight", unless otherwise specified.

(1) Center Line Average Roughness (Ra)

The center line average roughness on the surface of the substrate was determined as follows by using a surface roughness apparatus (SE-3F) [manufactured by Kosaka Institute Co.]. That is, a portion of a sampling length L (2.5 mm) was sampled in the direction of the center line from a film cross sectional curve. A value given by the following formula is represented by "μm" when expressing the roughness curve: y=f(x), indicating the center line for the sampled portion on the x-axis and the direction of the longitudinal stretching on the y-axis. The center line average roughness (Ra) is represented by determining ten cross sectional curves from the surface of the specimen film and expressed by an average value for the center line roughness of the sampled portion determined from the cross sectional curves. Further, the tip radius of the stylus was 2 μm, the load was 30 mg and the cut-off value was 0.08 mm.

$$Ra = 1/L \int_0^L |f(x)| dx$$

(2) Tensile Test ($F_5$ value)

A specimen substrate of 50 mm in length and 15 mm in width was pulled at a rate of 50 mm/min in a room adjusted to a temperature of 23° C. and a humidity of 50% RH by using a tensilon tester Intesco Model 2001 (manufactured by Intesco Co.), and the strength at 5% elongation was defined as $F_5$ value.

(3) Heat Shrinkage

By using a circulating hot-air oven (manufactured by Tabai Seisakusho, Ltd.), the sample substrate was subjected to a free end heat treatment at a temperature of 100° C. for 30 minutes, and the dimensional change in the longitudinal direction (machine direction) of the substrate after the heat treatment was expressed by %.

(4) Slipperiness (F/F μd)

Two pieces of substrate cut out to a size of 15 mm in width and 150 mm in length were. placed in layers on a flat glass plate. Then, a rubber plate was placed on the substrate, and a load was further applied thereon, so that the contact pressure of the two pieces of substrate would become 2 g/cm². Under this condition, the two pieces of substrate were allowed to move sliding against each other at a rate of 20 mm/min and the produced frictional force was measured. The coefficient of friction at a point where they were slided along a length of 5 mm was expressed as coefficient of dynamic friction (F/F μd).

The measurement was conducted in an atmosphere of 23° C.±1° C. and 50%±5% RH.

(5) Glass transition point (Tg)

The glass transition point was measured in the following way by using a differential calorimeter Model $SSC_{580}$ $DSC_{20}$ (manufactured by Seiko Electronic Industry Co., Ltd.). 10 mg of a freeze-dried sample was set in the DSC apparatus, heated to a temperature of 200° C. at a rate of 10° C./min, then quickly cooled with liquid nitrogen and again heated within the range of −50° C. to 200° C. at a rate of 10° C./min to determine the glass transition point. The glass transition point is sensed in the form of parallel movement of the base line with bending of the DSC curve by change of specific heat. The crossing point of the tangential line of the base line at a temperature below the bending point and the tangential line at a point where the inclination of the bent portion becomes maximal was reckoned as the starting point of bending, and the temperature at this point was expressed as glass transition point.

(6) Adhesiveness

After allowing an optical tape to stand in an atmosphere of a temperature of 60° C. and 95% RH for 1,000 hours, a double-coated adhesive tape was stuck on a stainless steel plate of 1 mm in thickness was pasted on the said optical tape in such a manner that the recording layer side would contact the adhesive tape. Thereafter, the substrate was peeled from the optical recording layer at an angle of 180° and the peel strength was measured by a tensile testing machine at a rate of 500 mm/min. The adhesive strength was expressed as a relative ratio to the adhesive strength of the film made of a ethylene terephthalate homopolymer.

(7) Surface resistivity

A concentric circular electrode (16008A (trade name), manufactured by Yokokawa Hewlet Packard, Ltd.) composed of a 50 mmφ inner electrode and a 70 mmφ outer electrode was attached to the sample substrate in an atmosphere of a temperature of 23° C. and 50% RH. A voltage of 100 V was applied to the sample substrate and its surface resistivity was measured by a high ohmmeter (trade name: 4329A) of the same company.

(8) Change of film haze

The film haze at normal temperature was expressed as $H_0$ and the haze after leaving the substrate in an air oven of a temperature of 170° C. was expressed as $H_1$, and the change of film haze was determined from the difference between $H_1$ and $H_0$. The film haze was measured according to JIS-K6714 by using a spectroscopic hazemeter NDH-20D (manufactured by Nippon Denshoku Kogyo KK).

Example 1

87 parts of terephthalic acid and 42 parts of ethylene glycol were reacted in the presence of 100 parts of bis-(b-hydroxyethyl) terephthalate oligomer at a temperature of 260° C. under normal pressure to obtain a polyester oligomer with a degree of esterification of 97%.

Then, 0.014 part of ethyl acid phosphate, 0.022 part of antimony trioxide and 0.086 part of magnesium acetate were added to carry out a polycondensation reaction, thereby obtaining a polyester (A) with an intrinsic viscosity of 0.65.

The thus obtained polyester (A), after dried, was extruded from the die of an extruder at a temperature of 290° C. and cast onto a cooling drum using an electrostatic pinning method to form an amorphous polyester sheet having a thickness of 100 μm.

This sheet was stretched 3.5 times in the machine direction at a temperature of 95° C. Then an aqueous coating solution composed of 95 parts of an aqueous polyester composed of 92 mol % of terephthalic acid and 8 mol % of sodium sulfo isophthalic acid as dicarboxylic acid moiety and 75 mol % of ethylene glycol and 25 mol % of diethylene glycol as glycol moiety, 5 parts of silica sol having an average particle size of 0.07 μm and 1,900 parts of water, was coated on one side of said sheet. Then the coated sheet was stretched 3.5 times transversely at a temperature of 110° C., heat-treated at a temperature of 230° C. and given a relaxation in the machine direction to obtain a biaxially stretched polyester film having a coat layer of 0.06 μm in thickness and a polyester film as a base film of 8 μm in thickness.

The center line average roughness (Ra) on the non-coated surface of this biaxially stretched polyester film was 0.002 μm, and (Ra$^4$) on the surface of the coating layer was 0.008 μm.

The $F_5$ value in the longitudinal direction of the substrate was 12.5 kg/mm$^2$, and the heat shrinkage in the longitudinal direction of the film after a 30-minute treatment at a temperature of 100° C. was 1.5%.

The workability of the film in winding-up and unwinding was excellent.

On the non-coated surface of the substrate, there were formed successively an Al reflective layer of 1,000 Å in thickness, a $Ta_2O_5$ dielectric layer of 1,500 Å in thickness, a $Ge_{22}Sb_{28}Te_{50}$ (atom %) recording layer of 700 521 in thickness and a $Ta_2O_5$ dielectric layer of 1,100 Å in thickness by sputtering in vacua in the same chamber to prepare a phase-change recording medium. This phase-change recording medium was let run at a linear velocity of 4 m/s and semiconductor laser light was applied to the running recording medium from its recording layer side to record a signal of 1 MHz. Therecording medium showed an excellent C/N ratio over 50 dB and was also capable of overwrite.

Example 2

On the non-coated surface of the continuous film of 8 mm in thickness, obtained in Example 1, there were formed successively an Al reflective layer of 500 Å in thickness, a $Tb_{22}Fe_{70}CO_8$ (atom %) recording layer of 300 Å in thickness and a silicon nitride ($Si_3N_4$) dielectric layer of 700 Å in thickness by sputtering in vacua in a same chamber to obtain a magnetic optical recording medium. This magnetic optical recording medium, after blanket erase with an electromagnet, was let run at a linear velocity of 4 m/s and exposed to semiconductor laser light via the recording layer while applying a biased magnetic field of 200 Oe to record a signal of 1 MHz. Consequently, a good C/N ratio over 50 dB was obtained.

Comparative Example 1

A polyester film was obtained by following the same procedure as Example 1 except that no coating was provided on the polyester film as the base film. The obtained polyester film was poor in slipperiness and subject to blocking and thus could not be put to practical use.

Comparative Example 2

A polyester film was obtained by following the procedure of Example 1 except for using of an aqueous coating agent composed of 100 parts of an aqueous polyester composed of 92 mol % of terephthalic acid and 8 mol % of sodium sulfo isophthalic acid as dicarboxylic acid moiety and 75 mol % of ethylene glycol and 25 mol % of diethylene glycol as glycol moiety and 1,900 parts of water. The center line average roughness on the surface of the coating layer of the obtained polyester film was 0.002 μm. This substrate was poor in slipperiness and subject to blocking and could not be put to practical use.

Example 3

87 parts of terephthalic acid and 42 parts of ethylene glycol were reacted in the presence of 100 parts of a bis-(β-hydroxyethyl) terephthalate oligomer at a temperature of 260° C. under normal pressure to obtain a polyester oligomer with an esterification degree of 97%.

Then an ethylene glycol slurry of spherical silica having an average particle size of 0.27 μm was added in an amount of 2% by weight based on the polyester, after which 0.014 part of ethyl acid phosphate, 0.022 part of antimony trioxide and 0.086 part of magnesium acetate were added to carry out a polycondensation reaction, thereby obtaining a polyester (B) having an intrinsic viscosity of 0.65. The polyester obtained without adding the particles in the above process is designated polyester (A).

The intrinsic viscosity of the polyester (A) was 0.62.

The polyester (A) and the polyester (B) were dried separately, then melted at a temperature of 287° C. in the separate extruders, joined in a pipe so that the polyester (B) layer would be laminated on the polyester (A) layer, and then quickly cooled to form a non-stretched film. This non-stretched film was first stretched 2.4 times in the machine direction at a temperature of 84° C. and then further stretched 1.25 times in the same direction at a temperature of 95° C. This film was then stretched 3.9 times in the transverse direction at a temperature of 120° C. heat treated at a temperature of 219° C. and subjected to a relaxing treatment in the machine direction to obtain a film with an overall thickness of 15 μm. The thickness of the layer (B) of the obtained film was 0.9 μm.

The center line average roughness ($Ra^A$) on the surface of the polyester film (A) was 0.002 μm, the ($Ra^B$) on the surface of the polyester film (B) was 0.014 μm and the coefficient of dynamic friction between the surface (A) and the surface (B) was 0.41. $F_5$ in the longitudinal direction of the substrate was 12.8 kg/mm$^2$ and the heat shrinkage of the substrate in its longitudinal direction after heating at a temperature of 100° C. for 30 minutes was 1.3%.

On the layer (B) of the obtained continuous film of 15 μm in thickness, there were formed successively an Al reflective layer of 1,000 Å in thickness, a $Ta_2O_5$ dielectric layer of 1,500 Å in thickness, a $Ge_{22}Sb_{28}Te_{50}$ (atom %) recording layer of 700 Å in thickness and a $Ta_2O_5$ dielectric layer of 1,100 Å in thickness by sputtering in vacua in a same chamber to obtain a phase-change recording medium. This phase-change recording medium was let run at a linear velocity of 4 m/s and exposed to semiconductor laser light from the recording layer side to record a signal of 1 MHz. This recording medium showed an excellent C/N ratio over 50 dB and was also capable of overwrite.

Example 4

The polyester (A) obtained in Example 3 was dried, extruded from the die of an extruder at a temperature of 290° C. and cast onto a cooling drum using the electrostatic pinning method to obtain an amorphous polyester sheet having a thickness of 100 μm.

This sheet was stretched 3.5 times in the machine direction at a temperature of 95° C. Then an aqueous coating composition composed of 95 parts of an aqueous polyester composed of 92 mol % of terephthalic acid and 8 mol % of sodium sulofo isophthalic acid as dicarboxylic acid moiety and 75 mol % of ethylene glycol and 25 mol % of diethylene glycol as glycol moiety, 5 parts of silica sol having an average particle size of 0.07 μm and 1,900 parts of water was coated on the surface (A) of the said polyester sheet. The coated sheet was then stretched 3.5 times in the transverse direction at a temperature of 110° C. heat-treated at a temperature of 230° C. and given a relaxation in the machine direction to obtain a biaxially stretched polyester film having a coat thickness of 0.06 μm and a polyester film as a base film of the thickness of 8 μm.

The center line average roughness ($Ra^A$) on the surface (A) to be disposed with a recording layer of the thus obtained biaxially stretched polyester film was 0.002 μm while the center line average roughness ($Ra^B$) on the surface (B) to be disposed with the coating layer containing a lubricant was 0.008 μm, and the coefficient of dynamic friction between the surface (A) and the surface (B) was 0.45. $F_5$ of the film in the longitudinal direction was 12.5 kg/mm$^2$ and the heat shrinkage factor of the film in the longitudinal direction after heating at a temperature of 100° C. for 30 minutes was 1.5%.

A recording layer was formed on this film in the same way as Example 3 to obtain a optical tape. The obtained optical tape had good recording performance.

Example 5

On the surface (A) of the film obtained in Example 4, there were formed successively an Al reflective layer of 500 Å in thickness, a $Tb22Fe70Co8$ (atom %) recording layer of 300 Å in thickness and a silicon nitride ($S_{13}N_4$) dielectric layer of 700 Å in thickness by sputtering in vacua in a same chamber to form a magnetic optical recording medium. After blanket erase with an electromagnet, this magnetic optical recording medium was let run at a linear velocity of 4 m/s and exposed to semiconductor laser light from the recording layer side while applying a biased magnetic field of 200 Oe to record a signal of 1 MHz. This recording medium showed a good C/N ratio over 50 dB.

The results obtained in the foregoing Examples and Comparative Examples are shown collectively in Table 1.

TABLE 1

| | | Ra (μm) | Dynamic coefficient of friction F/F μd | $F_5$ (kg/mm$^2$) | Heat shrinkage (%) | Recording performance |
|---|---|---|---|---|---|---|
| Example 3 | A | 0.002 | 0.41 | 12.8 | 1.3 | ○ |
| | B | 0.014 | | | | |
| Example 4 | A | 0.002 | 0.45 | 12.5 | 1.5 | ○ |
| | B | 0.008 | | | | |
| Example 5 | A | 0.002 | 0.45 | 12.5 | 1.5 | ○ |
| | B | 0.008 | | | | |

Example 6

87 parts of terephthalic acid and 42 parts of ethylene glycol were reacted in the presence of 100 parts of a bis-(β-hydroxyethyl) terephthalate oligomer at a temperature of 260° C. under normal pressure to carry out esterification, thereby obtaining a polyester oligomer with a degree of esterification of 97%.

Then 0.014 part of ethyl acid phosphate, 0.022 part of antimony trioxide and 0.086 part of magnesium acetate were added to carry out a polycondensation reaction, thereby obtaining a polyester having an intrinsic viscosity of 0.65.

This polyester was dried, extruded at a temperature of 290° C. and cast onto a cooling drum using the electrostatic pinning technique to obtain an amorphous polyester sheet having a thickness of 100 μm.

This sheet was stretched 3.5 times in the machine direction at a temperature of 95° C. Then an aqueous coating solution composed of 95 parts of an aqueous polyester (A) composed of 92 mol % of terephthalic acid and 8 mol % of sodium sulfo isophthalic acid as dicarboxylic acid moiety and 75 mol % of ethylene glycol and 25 mol % of diethylene glycol as glycol moiety, 5 parts of silica sol having an average particle size of 0.07 μm and 1,900 parts of water was coated on the surface of the side (A) of said polyester sheet. On the other hand, an aqueous coating solution composed of 100 parts of an aqueous polyester (A) and 1,900 parts of water was coated on the surface of the side (B)of the said polyester film. The thus coated sheet was stretched 3.5 times in the transverse direction, then heat-treated at a temperature of 230° C. and subjected to longitudinal relaxation to obtain a biaxially stretched polyester film with an overall thickness of 8 μm.

Tg of the aqueous polyester (A) was 42° C. The center line average roughness ($Ra^A$) on the surface of the coating layer (A) side of the obtained biaxially stretched polyester film was 0.008 μm. The center line average roughness ($Ra^B$) on the surface of the coating layer (B) side of the said film was 0.002 μm. $F_5$ of the substrate in its longitudinal direction was 12.5 kg/mm$^2$, and the heat shrinkage of the substrate in the longitudinal direction after heating at a temperature of 100° C. for 30 minutes was 1.5%. The film showed good workability for wind-up and unwinding.

On the surface of the coating layer (B) side of the said film, there were formed successively an Al reflective layer of 1,000 Å in thickness, an $Ta_2O_5$ dielectric layer of 1,500 Å in thickness, a $Ge_{22}Sb_{28}Te_{50}$ (atom %) recording layer of 700 Å in thickness and a $Ta_2O_5$ dielectric layer of 1,100 Å in thickness by sputtering in vacua in a same chamber to obtain a phase-change recording medium. This phase-change recording medium was let run at a linear velocity of 4 m/s and exposed to semiconductor laser light from the recording layer side to record a signal of 1 MHz. As a result, the recording medium had a good C/N ratio over 50 dB and was also capable of overwrite.

Adhesion between the polyester film and the recording layer was rated to be excellent in the evaluation of adhesion.

Comparative Example 3

A continuous polyester film of 8 μm in thickness was obtained in the same way as Example 6 except that no coating was disposed on the surface of the side (A) of the film. The obtained film was poor in slipperiness and subject to blocking and could not be put to practical use.

Comparative Example 4

A biaxially stretched polyester film was obtained by following the same procedure as Example 6 except that an aqueous coating solution composed of 100 parts of an aqueous polyester composed of 92 mol % of terephthalic acid and 8 mol % of sodium sulfo isophthalic acid as dicarboxylic acid moiety and 75 mol % of ethylene glycol and 25 mol % of diethylene glycol as glycol moiety and 1,900 parts of water was coated on the surface of the side (B) of the polyester film as a based film. The center line average roughness of the surface of the coating layer side of the film was 0.002 μm. The obtained film was poor in slipperiness. It was also subject to blocking and could not be put to practical use.

Example 7

On the surface of the coating layer (B) side of the film obtained in Example 6, there were formed successively an Al reflective layer of 500 Å in thickness, a $Tb_{22}Fe_{70}Co_8$ (atom %) recording layer of 300 Å in thickness and a silicon nitride ($Si_3N_4$) dielectric layer of 700 Å in thickness by sputtering in vacua in a same chamber, thereby obtaining a magnetic optical recording medium. The obtained magnetic optical recording medium, after blanket erase with an electromagnet, was let run at a linear velocity of 4 m/s and exposed to semiconductor laser light via the recording layer while applying a biased magnetic field of 2,000 Oe to record a signal of 1 MHz. There was obtained a good C/N above 50 dB.

The results obtained in the foregoing Examples and Comparative Examples are summarized in Table 2.

TABLE 2

|  |  | Ra (μm) | Work-ability | $F_5$ (kg/mm$^2$) | Heat shrinkage (%) | Adhesive-ness |
|---|---|---|---|---|---|---|
| Example 6 | A | 0.008 | ○ | 12.5 | 1.5 | — |
|  | B | 0.002 |  |  |  | 9.5 |
| Comp. Example 3 | A | 0.002 | X | 12.5 | 1.5 | — |
|  | B | 0.002 |  |  |  | 9.5 |
| Comp. Example 4 | A | 0.008 | X | 12.5 | 1.5 | — |
|  | B | 0.002 |  |  |  | 9.5 |
| Example 7 | A | 0.008 | ○ | 12.5 | 1.5 | — |
|  | B | 0.002 |  |  |  | 9.5 |

Example 8

87 parts of terephthalic acid and 42 parts of ethylene glycol were reacted in the presence of 100 parts of a bis-(β-hydroxyethyl) terephthalate oligomer at a temperature of 260° C. under normal pressure to obtain a polyester oligomer with a degree of esterification of 97%.

Then, 0.014 part of ethyl acid phosphate, 0.022 part of antimony trioxide and 0.086 part of magnesium acetate were added to carry out a polycondensation reaction, thereby obtaining a polyester (A1) having an intrinsic viscosity of 0.65.

This polyester was dried, extruded at a temperature of 290° C. and cast onto a cooling drum using an electrostatic pinning method to obtain an amorphous polyester sheet having a thickness of 100 μm.

This sheet was stretched 3.5 times in the machine direction at a temperature of 95° C. Then, an aqueous coating solution composed of 95 parts of an aqueous polyester (A2) composed of 92 mol % of terephthalic acid and 8 mol % of sodium sulfo isophthalic acid as dicarboxylic acid moiety and 75 mol % of ethylene glycol and 25 mol % of diethylene glycol as glycol moiety, 5 parts of silica sol having an average particle size of 0.07 μm and 1,900 parts of water was applied on the surface of the side (A) of the said polyester sheet. The coated sheet was further stretched 3.5 times in the transverse direction at a temperature of 110° C., then heat-treated at a temperature of 230° C. and subjected to a relaxing treatment in the machine direction to obtain a biaxially stretched polyester film with a coating layer thickness of 0.06 μm and a base polyester film thickness of 8 μm.

A coating solution composed of 1 part of γ-aminopropyltriethoxysilane, 0.1 part of water and 29 parts of ethyl alcohol was applied on both sides of the obtained polyester film and dried to form an oligomer deposition preventing layer of 0.1 μm in thickness on both sides of the said film.

The center line average roughness ($Ra^A$) on the surface of the coating layer (A) side of the thus obtained biaxially stretched polyester film formed with an oligomer deposition preventing layer on both sides thereof was 0.008 μm, and the center line average roughness ($Ra^B$) on the surface of the coating layer (B) side was 0.002 μm. $F_5$ in the longitudinal direction of the substrate was 12.5 kg/mm$^2$, and the heat shrinkage factor of the substrate in its longitudinal direction after left under a temperature of 100° C. for 30 minutes was 1.5%.

The film haze $H_0$ of the substrate was 0.8%. The film haze $H_1$ of the substrate after the heat-treatment was also 0.8%, indicating no change of film haze after the heat-treatment.

Also, there was noted no deposition of oligomer in the film after the heat-treatment.

On the surface of the coating layer (B) side of the thus obtained continuous film of 8 μm in thickness, there were formed successively an Al reflective layer of 1,000 Å in thickness, a $Ta_2O_5$ dielectric layer of 1,500 Å in thickness, a $Ge_{22}Sb_{28}Te_{50}$ (atom %) recording layer of 700 Å in thickness and a $Ta_2O_5$ dielectric layer of 1,100 Å in thickness by sputtering in vacua in a same chamber to obtain a phase-change recording medium. This phase-change recording medium was let run at a linear velocity of 4 m/s and semiconductor laser light was applied from the recording layer side to record a signal of 1 MHz. The recording medium showed a good C/N ratio over 50 dB and was also capable of overwrite.

Example 9

A optical tape was obtained by following the procedure of Example 8 except that, instead of conducting coating with γ-aminopropyltriethoxysilane, a coating solution composed of 90 parts of polysulfone (UDEL P1-1700, Union Carbide Corp.) as the resin having a glass transition temperature not less than 150° C. and 3,910 parts of N,N-dimethylformamide was applied on both sides of the polyester film and dried to form an oligomer deposition preventing layer of 0.1 μm in thickness on both sides of the film.

The obtained optical tape had excellent recording performance.

Example 10

51 parts of ethyl acrylate, 40 parts of methyl methacrylate, 9 parts of methacrylic acid, 0.5 parts of dodecylmercaptan and 1 part of water were uniformly mixed by a blender to prepare a monomer emulsion. This monomer emulsion and 0.8 part of ammonium peroxide dissolved in 1.5 parts of water were separately added dropwise into 187 parts of water of a temperature of 75° C. to carry out a reaction, the reaction temperature being maintained at a temperature of 75°–85° C. all the while. After the dropwise addition was completed, the reaction solution was kept at a temperature of 80° C. for 3 minutes and 28% ammonium water was added thereto to adjust the pH of the reaction solution to 7.5. In this state, the reaction solution was subjected to aging for 30 minutes to obtain a polyacryl water dispersion (B1).

The polyester (A1) obtained in Example 8 was dried, extruded at a temperature of 290° C. and cast onto a cooling drum using an electrostatic pinning technique to obtain an amorphous polyester sheet of 100 μm in thickness.

This sheet was stretched 3.5 times in the machine direction at a temperature of 95° C. Then an aqueous coating solution composed of 95 parts of the polyacryl water dispersion (B1), 5 parts of silica sol with an average particle size of 0.07 μm and 1,900 parts of water was applied on the A side of the polyester film, while an aqueous coating solution composed of 100 parts of the polyacryl water dispersion (B1) and 1,900 parts of water was applied on the surface of the side (B) thereof. The thus coated polyester sheet was further stretched 3.5 times in the transverse direction at a temperature of 110° C., then heat treated at a temperature of 230° C. and relaxed in the machine direction to obtain a biaxially stretched polyester film having a coating layer of thickness of 0.06 μm and a base polyester film of thickness of 8 μm.

By using this biaxially stretched polyester film, a optical tape was produced in the same way as Example 8. The obtained optical tape showed excellent performance.

Example 11

The polyester (A1) obtained in Example 8 was dried, extruded at a temperature of 290° C. and cast onto a cooling drum using an electrostatic pinning method to obtain an amorphous polyester sheet having a thickness of 100 μm.

This sheet was stretched 3.5 times in the machine direction at a temperature of 95° C. Then, an aqueous coating solution composed of 95 parts of an aqueous polyester (A2) composed of 92 mol % of terephthalic acid and 8 mol % of sodium sulfo isophthalic acid as dicarboxylic acid moiety and 75 mol % of ethylene glycol and 25 mol % of diethylene glycol as glycol moiety, 5 parts of silica sol having an average particle size of 0.07 μm and 1,900 parts of water was applied on the surface of the side (A) of the said polyester film, while an aqueous coating solution composed of 100 parts of the said aqueous polyester and 1,900 parts of water was applied on the surface of the side (B) thereof. The coated polyester film was further stretched 3.5 times in the transverse direction at a temperature of 110° C., heat-treated at a temperature of 230° C. and subjected to relaxing treatment to form a biaxially stretched polyester film having a coating layer of thickness of 0.06 μm and a base polyester film of thickness of 8 μm.

By using this biaxially stretched polyester film, a optical tape was produced in the same way as Example 8. The obtained optical tape had the excellent recording performance.

Example 12

On the surface of the coating layer (B) side of the continuous film of 8 μm in thickness obtained in Example 8, there were formed successively an of 500 Å in thickness Al reflective layer of 500 Å in thickness, a $Tb_{22}Fe_{70}Co_8$ (atom %) recording layer of 300 Å in thickness and a silicon nitride ($Si_3N_4$) dielectric layer of 700 Å in thickness by sputtering in vacua in a same chamber to make a magnetic optical recording medium. This magnetic optical recording medium, after blanket erase with an electromagnet, was let run at a linear velocity of 4 m/s and exposed to semiconductor laser light via the recording layer while applying a biased magnetic field of 200 Oe to record a signal of 1 MHz. There was obtained a good C/N ratio above 50 dB.

The results obtained in Examples 8–12 are shown in Table 3.

TABLE 3

|  | Layer | Ra (μm) | $F_5$ (kg/mm²) | Heat shrinkage (%) | Change of haze after heat treatment (%) | Recording performance |
|---|---|---|---|---|---|---|
| Example 8 | A | 0.008 | 12.5 | 1.5 | 0.0 | ○ |
|  | B | 0.002 |  |  |  |  |
| Example 9 | A | 0.008 | 12.5 | 1.5 | 0.0 | ○ |
|  | B | 0.002 |  |  |  |  |
| Example 10 | A | 0.008 | 12.5 | 1.5 | 0.0 | ○ |
|  | B | 0.002 |  |  |  |  |
| Example 11 | A | 0.008 | 12.5 | 1.5 | 0.5 | ○ |
|  | B | 0.002 |  |  |  |  |
| Example 12 | A | 0.008 | 12.5 | 1.5 | 0.0 | ○ |
|  | B | 0.002 |  |  |  |  |

Comparative Example 5

87 parts of terephthalic acid and 42 parts of ethylene glycol were reacted in the presence of 100 parts of a bis-(β-hydroxyethyl) terephthalate oligomer at a temperature of 260° C. under normal pressure to obtain a polyester oligomer having a degree of esterification of 97%.

Then 0.014 part of ethyl acid phosphate, 0.022 part of antimony trioxide and 0.086 part of magnesium acetate were added to carry out a polycondensation reaction, thereby obtaining a polyester (A1) having an intrinsic viscosity of 0.65.

This polyester was dried, extruded from the die of an extruder at a temperature of 290° C. and cast onto a cooling drum using an electrostatic pinning method to obtain an amorphous polyester sheet having a thickness of 100 μm.

This sheet was stretched 3.5 times in the machine direction at a temperature of 95° C. and 3.5 times in the transverse direction at a temperature of 110° C. then heat-treated at a temperature of 230° C. and subjected to a relaxing treatment in the machine direction to obtain a biaxially stretched polyester film having a thickness of 8 μm.

The center line average roughness of the obtained film was 0.002 μm. $F_5$ of the substrate in the machine direction (longitudinal direction) was 12.5 kg/mm$^2$, and the heat shrinkage of the substrate in the longitudinal direction after left at a temperature of 100° C. for 30 minutes was 1.5%. On one surface of the obtained film, there were formed successively an Al reflective layer of 1,000 Å in thickness, a $Ta_2O_5$ dielectric layer of 1,500 Å in thickness, a $Ge_{22}Sb_{28}Te_{50}$ (atom %) recording layer of 700 Å in thickness and a $Ta_2O_5$ dielectric layer of 1,100 Å in thickness by sputtering in vacua in a same chamber to obtain a phase-change recording medium. This phase-change recording medium caused drop out frequently and could not be put to practical use.

Comparative Example 6

To the polyester (A1) obtained in Comparative Example 5, there were added 1.45% by weight of sodium dodecylbenzenesulfonate as an incorporated antistatic agent and 0.15% by weight of a polyethylene having a molecular weight of 8,000 as compatibilizing agent for the polyester, and the resultant mixture was worked into a biaxially stretched film in the same way as Example 5. The surface resistivity of this film was $1 \times 10^{11}$ Ω/□, the film surface showing antistatic property. Then an optical recording layer was formed on this film according to Comparative Example 5 to obtain a optical tape. In the course of formation of the optical recording layer, partial dispersion of sodium dodecylbenzenesulfonate was observed in the vacuum chamber. Further, adhesion between the optical recording layer and the polyester film of the obtained optical tape was unsatisfactory. That is, when a cellophane adhesive tape was stuck to the optical recording layer and pulled, the recording layer peeled off easily.

Example 13

On the surface of the opposite side to the optical recording layer of the recording medium obtained in Comparative Example 5, a mixture of 60 parts of polydimethylallylammonium chloride (molecular weight: 28,000), 35 parts of polyvinyl alcohol (saponification degree: 88%; viscosity of 4% aqueous solution at a temperature of 20° C.: 5.4 cps) and 5 parts of alumina (particle size: 0.07 μm) was applied and dried to form a coating layer having a thickness of 0.1 μm.

Example 14

On the surface of the opposite side the optical recording layer of the recording medium obtained in Comparative Example 5, a mixture of 85 parts (by dry weight) of an acrylic ester copolymer (Jurymer ET-410, produced by Nippon Pure Chemicals Co., Ltd.) (solid content: 30 wt %), 10 parts of sodium octadecylsulfonate and 5 parts (by dry weight) of a silica water dispersion (Snowtex 20L, produced by Nissan Chemicals Co., Ltd; particle size: 0.04–0.05 μm; solid content: 20 wt %) was applied and dried to form a coating layer having a thickness of 0.1 μm.

Example 15

The amorphous polyester sheet obtained in Comparative Example 5 was stretched 3.5 times in the machine direction at a temperature of 95° C. and before stretching in the transverse direction, an aqueous coating solution of the same composition as used in Example 13 was applied on the sheet and dried to form a coating layer. Then the sheet was stretched in the transverse direction, heat-treated and relaxed in accordance with Comparative Example 5 to obtain a biaxially stretched polyester film. The thickness of the antistatic layer of the obtained film was 0.05 μm (in solid state after drying). This film was worked into an optical tape in the same way as Comparative Example 5.

Example 16

The amorphous polyester sheet obtained in Comparative Example 5 was stretched 3.5 times in the machine direction at a temperature of 95° C. and before stretching in transverse direction, a coating layer of the following composition was formed on the sheet. That is, a mixture of 90 parts (by dry weight) of an acrylic ester copolymer (Jurymer ET-410, produced by Nippon Pure Chemicals Co., Ltd.) and 10 parts (by dry weight) of a silica water dispersion (Snowtex 20L, produced by Nissan Chemicals Co., Ltd; particle size: 0.04–0.05 μm; solid content: 20 wt %) was applied on the sheet and dried to form a coating layer. Thereafter, the sheet was stretched in the transverse direction, heat-treated and relaxed according to Comparative Example 5 to obtain a biaxially stretched polyester film. The thickness of the coating layer of the obtained film was 0.05 μm (in solid state after drying). On this coating layer, ITO was deposited by sputtering to a thickness of 0.05 μm. This film was worked into a optical tape in the same way as Comparative Example 8.

Example 17

On the non-coated surface of the biaxially stretched polyester film obtained in Example 15, there were formed successively an Al reflective layer of 500 Å in thickness, a $Tb_{22}Fe_{70}Co_8$ (atom %) recording layer of 800 Å in thickness and a silicon nitride ($Si_3N_4$) dielectric layer of 700 Å in thickness in vacua in a same chamber to obtain a magnetic optical recording medium. This magnetic optical recording medium, after blanket erase with an electromagnet, was let run at a linear velocity of 4 m/s and exposed to semiconductor laser light via the recording layer side while applying a biased magnetic field of 200 Oe to record a signal of 1 MHz. There was obtained a good C/N ratio above 50 dB.

Of the optical tape samples obtained in Comparative Examples 5–6 and Examples 13–17, that of Comparative Example 6 was small in adhesive strength between the optical recording layer and the polyester film and unsuited for practical use. Other six samples of optical tape were each let run at a linear velocity of 4 m/s and semiconductor laser light was applied thereto from the recording layer side to record a signal of 1 MHz. All of these samples were capable of normal recording and reading, but the optical tapes of the Examples were less in occurrence of drop out and thus superior to those of the Comparative Examples.

TABLE 4

|  | Comp. Example 5 | Example 13 | Example 14 | Examples 15 & 17 | Example 16 |
|---|---|---|---|---|---|
| Center line average roughness of the layer having antistatic property ($Ra^A$) (μm) | 0.002 | 0.006 | 0.008 | 0.008 | 0.009 |
| Coefficient of the friction (μd) | 1.1 | 0.6 | 0.4 | 0.5 | 0.6 |
| Surface resistivity of the layer having antistatic property Ω/ | $10^{15}$ | $1 \times 10^8$ | $1 \times 10^{10}$ | $1 \times 10^9$ | $10^7$ |

Comparative Example 7

87 parts of terephthalic acid and 42 parts of ethylene glycol were reacted in the presence of 100 parts of a bis-(β-hydroxyethyl) terephthalate oligomer at a temperature of 260° C. under normal pressure to obtain a polyester oligomer having a degree of esterification of 97%.

Then 0.014 part of ethyl acid phosphate, 0.022 part of antimony trioxide and 0.086 part of magnesium acetate were added to perform a polycondensation reaction, thereby obtaining a polyester (A1) having an intrinsic viscosity of 0.65.

This polyester was dried, extruded from the head of an extruder at a temperature of 290° C. and cast onto a cooling drum using an electrostatic pinning technique to obtain an amorphous polyester sheet having a thickness of 100 μm.

This sheet was stretched 3.5 times in the machine direction at a temperature of 95° C. and 3.5 times in the transverse direction at a temperature of 110° C. then heat-treated at a temperature of 230° C. and subjected to relaxing treatment in the machine direction to obtain a biaxially stretched polyester film with a coating layer thickness of 0.06 μm and a base polyester film thickness of 8 μm.

The center line average roughness of the surface of the obtained film was 0.002 μm. The $F_5$ value of the substrate in the machine direction (longitudinal direction) was 12.5 kg/mm$^2$, and the heat shrinkage of the substrate in the longitudinal direction after left at a temperature of 100° C. for 30 minutes was 1.5%. On one surface of the obtained film, there were formed successively an Al reflective layer of 1,000 Å in thickness, a $Ta_2O_5$ dielectric layer of 1,500 Å in thickness, a $Ge_{22}Sb_{28}Te_{50}$ (atom %) recording layer of 700 Å in thickness and a $Ta_2O_5$ dielectric layer of 1,100 Å in thickness by sputtering in vacua in a same chamber to obtain a phase-change recording medium.

Example 18

On the surface of the optical recording layer side of the recording medium obtained in Comparative Example 7, a mixture of 60 parts by weight of polydimethyldiallylammonium chloride (molecular weight: 28,000) and 40 parts by weight of polyvinyl alcohol (saponification degree: 88% viscosity of 4% aqueous solution at a temperature of 20° C.: 5.4 cps) was applied and dried to form a coating layer having a thickness of 450 Å (in solid state after drying).

Example 19

On the surface of the optical recording layer side of the recording medium obtained in Comparative Example 7, an ethanol solution of 100 parts by weight of a quaternary ammonium salt-containing acrylic polymer "ST-3000" (produced by Mitsubishi Yuka Co., Ltd.) was applied and dried to form a coating layer having a thickness of 500 Å (in solid state after drying).

Each of the thus obtained 3 samples of phase-change recording medium was let run at a linear velocity of 4 m/s and semiconductor laser light was applied thereto from the recording layer side to record a signal of 1 MHz. All of these samples were capable of normal recording and reading, but the optical tapes of Examples 18 and 19 were less in occurrence of drop out and superior to the product of Comparative Example 7.

Example 20

On the surface of the optical recording layer side of the recording medium obtained in Comparative Example 7, an aqueous solution of sodium dodecylbenzenesulfonate (softtype) was applied and dried to form a layer having a thickness of 500 Å (in solid state after drying). When the obtained optical tape was subjected to the same signal recording and reading test as conducted in Examples 18 and 19 and Comparative Example 7, it was less in occurrence of drop out than the product of Comparative Example 7 and found to be an excellent optical tape.

Example 21

On the surface of the optical recording layer side of the recording medium obtained in Comparative Example 7, ITO was deposited to a thickness of 200 Å by sputtering. When signal recording and reading were conducted with the obtained film in the same way as in Examples 18–19 and Comparative Example 7, the present product was less in occurrence of drop out than that of Comparative Example 7 and decided to be an excellent optical tape.

Comparative Example 8

On the surface of the optical recording layer side of the recording medium obtained in Comparative Example 7, a mixed solvent solution of isopropanol/methyl ethyl ketone (1/1) of methyl polymethacrylate (PMMA) having a molecular weight of about 10,000 was applied and dried to form a PMMA layer of 500 Å in thickness. When signal recording and reading were performed with the obtained film in the same way as in Comparative Example 7, the frequency of occurrence of drop out was equal to or even higher than that of the product of Comparative Example 7, indicating that this film was inferior to those of the Examples.

Example 22

On the continuous film of 8 μm in thickness obtained in Comparative Example 7, there were formed successively an Al reflective layer of 500 Å in thickness, a 300 Å thick $Tb_{22}Fe_{70}Co_8$ (atom %) recording layer of 300 Å in thickness and a silicon nitride ($Si_3N_4$) dielectric layer of 700 Å in thickness by sputtering in vacua in a same chamber, and then an antistatic treatment similar to that practiced in Example 18 was applied to the surface of the optical recording layer to obtain a magnetic optical recording medium. This magnetic optical recording medium, after blanket erase with an electromagnet, was let run at a linear velocity of 4 m/s and exposed to semiconductor laser light via the recording layer while applying a biased magnetic field of 200 Oe to record a signal of 1 MHz. There was obtained a good C/N ratio above 50 dB.

The properties of the substrates of Examples 1 to 22 are shown in Table 5.

Examples 23 to 45

Optical tapes were produced in the same way as in Examples above except that the constructions and compositions were varied as shown in Table 6. The properties thereof are shown in Table 6.

TABLE 5

| | Center line average roughness (μm) | | | $F_5$ | Heat shrinkage | Coefficient of dynamic friction | Change of film haze | Surface resistivity |
|---|---|---|---|---|---|---|---|---|
| | Side (A) | Side (B) | Base film | (kg/mm$^2$) | (%) | (F/F μd) | (ΔH) (%) | (Ω/□) |
| Example 1 | 0.008 | 0.002 | 0.002 | 12.5 | 1.5 | 0.45 | | |
| Example 2 | 0.008 | 0.002 | 0.002 | 12.5 | 1.5 | 0.45 | | |
| Example 3 | 0.014 | 0.002 | 0.002 | 12.8 | 1.3 | 0.41 | | |
| Example 4 | 0.008 | 0.002 | 0.002 | 12.5 | 1.5 | 0.45 | | |
| Example 5 | 0.008 | 0.002 | 0.002 | 12.5 | 1.5 | 0.45 | | |
| Example 6 | 0.008 | 0.002 | 0.002 | 12.5 | 1.5 | 0.48 | | |
| Example 7 | 0.008 | 0.002 | 0.002 | 12.5 | 1.5 | 0.48 | | |
| Example 8 | 0.008 | 0.002 | 0.002 | 12.5 | 1.5 | 0.46 | 0 | |
| Example 9 | 0.008 | 0.002 | 0.002 | 12.5 | 1.5 | 0.40 | 0 | |
| Example 10 | 0.008 | 0.002 | 0.002 | 12.5 | 1.5 | 0.39 | 0 | |
| Example 11 | 0.008 | 0.002 | 0.002 | 12.5 | 1.5 | 0.48 | 0 | |
| Example 12 | 0.008 | 0.002 | 0.002 | 12.5 | 1.5 | 0.46 | 0 | |
| Example 13 | 0.006 | 0.002 | 0.002 | 12.5 | 1.5 | 0.60 | | $1 \times 10^8$ |
| Example 14 | 0.008 | 0.002 | 0.002 | 12.5 | 1.5 | 0.40 | | $1 \times 10^{10}$ |
| Example 15 | 0.008 | 0.002 | 0.002 | 12.5 | 1.5 | 0.50 | | $2 \times 10^8$ |
| Example 16 | 0.009 | 0.002 | 0.002 | 12.5 | 1.5 | 0.60 | | $<10^7$ |
| Example 17 | 0.008 | 0.002 | 0.002 | 12.5 | 1.5 | 0.50 | | $2 \times 10^8$ |
| Example 18 | 0.008 | 0.002 | 0.002 | 12.5 | 1.5 | 0.49 | | $6 \times 10^9$ |
| Example 19 | 0.008 | 0.002 | 0.002 | 12.5 | 1.5 | 0.45 | | $8 \times 10^9$ |
| Example 20 | 0.008 | 0.002 | 0.002 | 12.5 | 1.5 | 0.45 | | $4 \times 10^8$ |
| Example 21 | 0.008 | 0.002 | 0.002 | 12.5 | 1.5 | 0.60 | | $<10^7$ |
| Example 22 | 0.008 | 0.002 | 0.002 | 12.5 | 1.5 | 0.50 | | $6 \times 10^9$ |

TABLE 6

| | Base polyester film | Side (A) | | | | | | | Side (B) | | | |
|---|---|---|---|---|---|---|---|---|---|---|---|---|
| | | Coating layer | Containing compound Z | Containing antistatic agent | Co-extruded Polyester Film | Containing compound Z | Containing antistatic agent | Roughening treatment | Coating layer | Containing compound Z | Co-extruded polyester film | Containing compound Z |
| Example 23 | Z/A | — | — | — | — | — | — | Z/N | — | — | — | — |
| Example 24 | Z/M | Z/C | — | — | — | — | — | — | — | — | Z/F | — |
| Example 25 | Z/M | — | — | — | Z/E | — | — | — | — | — | Z/F | — |
| Example 26 | Z/B | — | — | — | Z/E | — | — | — | Z/D | — | — | — |
| Example 27 | Z/B | Z/C | — | — | — | — | — | — | — | — | Z/F | — |
| Example 28 | Z/B | — | — | — | Z/E | — | — | — | Z/D | — | — | — |
| Example 29 | Z/B | — | — | — | Z/E | — | — | — | — | — | Z/F | — |
| Example 30 | Z/A | — | Z/G | — | — | — | — | — | — | — | — | — |
| Example 31 | Z/B | — | — | — | — | Z/O | — | — | — | — | — | — |
| Example 32 | Z/B | — | Z/G | — | — | — | — | — | — | — | — | Z/P |
| Example 33 | Z/B | — | — | — | — | Z/O | — | — | — | Z/H | — | — |
| Example 34 | Z/B | — | — | — | — | Z/O | — | — | — | — | — | Z/P |
| Example 35 | Z/B | — | — | — | — | — | Z/Q | — | — | — | — | — |
| Example 36 | Z/B | — | — | — | — | — | Z/Q | — | Z/D | — | — | — |
| Example 37 | Z/B | — | — | — | — | — | Z/Q | — | — | — | Z/F | — |
| Example 38 | Z/A | — | — | Z/I | — | — | — | — | Z/D | — | — | — |
| Example 39 | Z/M | — | — | Z/I | — | — | — | — | — | — | Z/F | — |
| Example 40 | Z/A | — | Z/C | — | — | — | — | — | — | — | — | — |
| Example 41 | Z/B | — | — | — | Z/E | — | — | — | — | — | — | — |
| Example 42 | Z/B | — | — | — | Z/E | — | — | — | — | — | — | — |
| Example 43 | Z/A | — | Z/R | — | — | — | — | — | — | Z/H | — | — |
| Example 44 | Z/B | — | — | — | — | Z/S | — | — | — | — | — | Z/P |
| Example 45 | Z/L | Z/C | — | — | — | — | — | — | — | — | — | — |

| | Antistatic layer formed on side (A) | | Antistatic layer formed on side (B) Coating layer | Center line average roughness (μm) | | | $F^5$ (kg/mm²) | Heat shrinkage (%) | Coefficient of dynamic friction (F/F μd) | Change of film haze (ΔH) (%) | Surface resistivity (A) (Ω/□) |
|---|---|---|---|---|---|---|---|---|---|---|---|
| | Coating layer | Coextruded polyester film | | Side (A) | Side (B) | Base film | | | | | |
| Example 23 | — | — | — | 0.150 | 0.002 | 0.002 | 12.5 | 1.5 | 0.28 | | |
| Example 24 | — | — | — | 0.010 | 0.003 | 0.009 | 12.5 | 1.5 | 0.35 | | |
| Example 25 | — | — | — | 0.014 | 0.003 | 0.009 | 12.5 | 1.5 | 0.37 | | |
| Example 26 | — | — | — | 0.014 | 0.002 | 0.002 | 12.5 | 1.5 | 0.40 | | |
| Example 27 | — | — | — | 0.008 | 0.002 | 0.002 | 12.5 | 1.5 | 0.41 | | |
| Example 28 | — | — | — | 0.014 | 0.002 | 0.002 | 12.5 | 1.5 | 0.50 | | |
| Example 29 | — | — | — | 0.014 | 0.002 | 0.002 | 12.5 | 1.5 | 0.32 | | |
| Example 30 | — | — | — | 0.008 | 0.002 | 0.002 | 12.5 | 1.5 | 0.40 | 2.0 | |
| Example 31 | — | — | — | 0.014 | 0.002 | 0.002 | 12.5 | 1.5 | 0.40 | 2.0 | |
| Example 32 | — | — | — | 0.008 | 0.002 | 0.002 | 12.5 | 1.5 | 0.45 | 0.0 | |
| Example 33 | — | — | — | 0.014 | 0.002 | 0.002 | 12.5 | 1.5 | 0.35 | 0.0 | |
| Example 34 | — | — | — | 0.014 | 0.002 | 0.002 | 12.5 | 1.5 | 0.35 | 0.0 | |
| Example 35 | — | — | — | 0.014 | 0.002 | 0.002 | 12.5 | 1.5 | 0.37 | | $10^{12}$ |
| Example 36 | — | — | — | 0.014 | 0.002 | 0.002 | 12.5 | 1.5 | 0.41 | | $10^{12}$ |
| Example 37 | — | — | — | 0.014 | 0.002 | 0.002 | 12.5 | 1.5 | 0.40 | | $10^{12}$ |
| Example 38 | — | — | — | 0.006 | 0.002 | 0.002 | 12.5 | 1.5 | 0.45 | | $10^9$ |
| Example 39 | — | — | — | 0.009 | 0.002 | 0.009 | 12.5 | 1.5 | 0.30 | | $10^8$ |
| Example 40 | Z/I | — | — | 0.008 | 0.002 | 0.002 | 12.5 | 1.5 | 0.45 | | $10^8$ |
| Example 41 | — | Z/Q | — | 0.010 | 0.002 | 0.002 | 12.5 | 1.5 | 0.65 | | $10^{12}$ |
| Example 42 | Z/I | — | — | 0.014 | 0.002 | 0.002 | 12.5 | 1.5 | 0.35 | | $10^8$ |
| Example 43 | — | — | Z/K | 0.008 | 0.002 | 0.002 | 12.5 | 1.5 | 0.45 | 0.0 | $10^9$ |
| Example 44 | — | — | Z/K | 0.014 | 0.002 | 0.002 | 12.5 | 1.5 | 0.33 | 0.0 | $10^{12}$ |
| Example 45 | — | — | — | 0.008 | 0.004 | 0.006 | 12.5 | 1.5 | 0.45 | | |

(NOTES)
Z/A: Same base polyester film (8 μm in thickness) as in Example 1.
Z/B: Same base polyester film (14.1 μm in thickness) as in Example 3.
Z/C: Same coating layer (A) (0.06 μm in thickness) as in Example 1.
Z/D: Same coating layer (B) (0.06 μm in thickness) as in Example 6.
Z/E: Same co-extruded polyester (A) (0.9 μm in thickness) film as in Example 3.
Z/F: A co-extruded polyester (B) film was produced in the same way as in Example 3 except for thickness of 0.9 μm.
Z/G: Same coating layer (A) (0.03 μm in thickness) as in Example 10.
Z/H: Same coating layer (B) (0.03 μm in thickness) as in Example 10.
Z/I: Same coating layer (A) (0.1 μm in thickness) as in Example 13.
Z/K: Same antistatic coating layer (450 Å in thickness) as in Example 18.
Z/L: A base film (8 μm in thickness) was produced in same way as in Example 1 except for adding 0.3 wt % of silica particles having 0.12 μm of an average particle size.
Z/M: A base film (14.1 μm in thickness) was produced in same way as in Example 3 except for adding 0.3 wt % of silica particles having 0.12 μm of an average particle size.
Z/N: The surface (A) of the polyester film as a base film having a center line average roughness (Ra) of 0.002 μm was subject to a sand-blast processing by using silica sand (mesh #2, manufactured by Mizuho Kogyo Co., ltd.).

TABLE 6-continued

Z/O: A co-extruded polyester film (A) having 0.9 μm in thickness and an intrinsic viscosity of 0.68 was produced in the same way as in Example 3 except for using 100 parts of dimethyl naphthalene-2,6-dicarboxylate.
Z/P: A co-extruded polyester film (B) having 0.9 μm in thickness and an intrinsic viscosity of 0.68 was produced in the same way as in Example 3 except for using 100 parts of dimethyl naphthalene-2,6-dicarboxylate.
Z/Q: A co-extruded polyester film (A) having 0.9 μm in thickness was produced in the same way as in Example 3 except for adding 0.5 wt % of sodium dodecylbenzenesulfonate as an antistatic agent.
Z/R: A coating layer (A) (0.03 μm in thickness) was produced in the same way as in Example 10 except for using 85 parts of the polyacryl water dispersion (B1) and adding 10 parts of sodium octadecylsulfonate as an antistatic agent.
Z/S: A co-extruded polyester film (A) having 0.9 μm in thickness was produced in the same way as in Example 3 except for using 100 parts of dimethyl naphthalene-2,6-dicarboxylate and adding 0.5 wt % of sodium dodecylbenzenesulfonate as an antistatic agent.

What is claimed is:

1. An optical tape comprising a substrate having surfaces A and B, wherein the substrate comprises:
   (i) a polyester film, or
   (ii) a polyester base film having a coating layer formed on at least one side thereof, or
   (iii) a polyester base film having a co-extruded polyester film on at least one side thereof,
   wherein said surface A has a center line average roughness ($Ra^A$) of 0.005 to 0.5 μm, and
   wherein said surface B has a center line average roughness ($Ra^B$) of not more than 0.05 μm,
   wherein said substrate has a tensile strength ($F_s$) in the longitudinal direction of not less than 8 kg/mm² and a heat shrinkage factor in the longitudinal direction when held at a temperature of 100° C. for 30 minutes of less than 5%, and
   wherein the change ($\Delta H$) in film haze of said substrate represented by the following formula is not more than 3%:

$$\Delta H = H_1 - H_0$$

wherein $\Delta H$ represents the change in film haze, $H_1$ represents the film haze of the substrate after 30-minute heat-treatment at a temperature of 170° C., and $H_0$ represents the film haze of the substrate at ordinary room temperature before the heat-treatment;
   and an optical recording layer on said surface B of said substrate.

2. An optical tape according to claim 1, wherein said substrate comprises a polyester base film; and a coating layer (A) or co-extruded polyester film (A) on the base film which provides said surface A.

3. An optical tape according to claim 2, wherein said substrate comprises the coating layer (A), and wherein coating layer (A) comprises a resin binder, a lubricant and a compound selected from (1) a compound capable of forming a crosslinked structure by application of heat or activated energy rays, (2) a heat-resistant resin having a glass transition temperature (Tg) of not less than 150° C., (3) an acrylic resin, or (4) an amide resin.

4. An optical tape according to claim 3, wherein said resin binder is selected from the group consisting of polyamides, polystyrenes, polycarbonates, polyarylates, polyacrylates, polyvinyl chloride, polyvinylidene chloride, polyvinyl butyral, polyvinyl alcohol, phenoxy resins, polyimides, epoxy resins, polyurethanes, silicone resins, melamine resins, cellulose resins, gelatin, copolymers of the monomers constituting said resins and a mixture thereof.

5. An optical tape according to claim 3, wherein said compound comprises a compound capable of forming a crosslinked structure by application of heat or activated energy rays selected from the group consisting of organosilane compounds, amino-substituted organosilane compounds, organotitanium compounds, amino-substituted organotitanium compounds and a mixture thereof,
   and wherein the organosilane compounds and amino-substituted organosilane compounds are represented by either of the following formulae (1) to (3):

$$R^1 - Si - (OR^2)_3 \qquad (1)$$

$$\begin{array}{c} R^1 \\ \diagdown \\ \phantom{R^2}Si - (OR^3)_n \\ \diagup \\ R^2 \end{array} \qquad (2)$$

$$(R^4)_{4-n} - Si - (R^3)_n \qquad (3)$$

wherein $R^1$ and $R^2$ represent independently alkyl group, cycloalkyl group, vinyl group, alkenyl group, aryl group, or any of these groups in which a part of the hydrogen atoms are substituted with other atom(s), or reactive functional group(s); $R^3$ represents alkyl group or substituted alkyl group; $R^4$ represents alkyl group, alkoxyl group, vinyl group, phenyl group, methacryloxy group, methacryloxypropyl group; $R^5$ represents halogen atom, tert-butylperoxy group, acyl group or isocyanate group; and n is 1 to 4.

6. An optical tape according to claim 3, wherein said compound comprises a heat-resistant resin having a glass transition temperature of not less than 150° C. selected from the group consisting of polysulfone, polyethersulfone, polyarylate, polyphenylene sulfide, polyetherimide, polyamide-imide, polyimide, aramide, polybenzoimidazole, polyhydantoin, and a mixture thereof.

7. An optical tape according to claim 3, wherein the content of the compound is 50 to 99.5% by weight based on the weight of the coating layer (A).

8. An optical tape according to claim 2, wherein said substrate comprises the co-extruded polyester film (A), and wherein co-extruded film (A) comprises a lubricant, and a compound selected from (1) a compound capable of forming a crosslinked structure by application of heat or activated energy rays, (2) a heat-resistant resin having a glass transition temperature (Tg) of not less than 150° C., (3) an acrylic resin, or (4) an amide resin.

9. An optical tape according to claim 8, wherein the content of the compound is 50 to 99.5% by weight based on the weight of the co-extruded polyester film (A).

10. An optical tape according to claim 2, wherein said substrate comprises coating layer (A) and the thickness of the coating layer (A) is 0.001 to 10 μm.

11. An optical tape according to claim 2, wherein said substrate comprises co-extruded polyester film (A) and the thickness of the co-extruded polyester (A) is 0.5 to 49.5 μm.

12. An optical tape according to claim 1, wherein said substrate comprises a polyester base film; a coating layer (A) or co-extruded polyester film (A) on the surface of the polyester base film; and a coating layer which provides said surface A on the surface of the coating layer (A) or co-extruded polyester film (A).

13. An optical tape according to claim 12, wherein said coating layer that provides surface A comprises a resin binder and a compound selected from (1) a compound capable of forming a crosslinked structure by application of heat or activated energy rays, (2) a heat-resistant resin having a glass transition temperature (Tg) of not less than 150° C., (3) an acrylic resin, or (4) an amide resin.

14. An optical tape according to claim 13, wherein said resin binder is one or more of polyamides, polystyrenes, polycarbonates, polyarylates, polyacrylates, polyvinyl chloride, polyvinylidene chloride, polyvinyl butyral, polyvinyl alcohol, phenoxy resins, polyimides, epoxy resins, polyurethanes, silicone resins, melamine resins, cellulose resins, gelatin, copolymers of the monomers constituting said resins or a mixture thereof.

15. An optical tape according to claim 13, wherein the content of the compound is 50 to 99.5% by weight based on the weight of the coating layer.

16. An optical tape according to claim 12, wherein the thickness of the coating layer that provides surface A is 0.0001 to 10 µm.

17. An optical tape according to claim 1, wherein said substrate comprises a polyester base film and a co-extruded polyester film (A) on the base film, wherein additional co-extruded polyester film is formed on the surface of the co-extruded polyester film (A), and wherein the additional co-extruded polyester film provides said surface A of the substrate.

18. An optical tape according to claim 17, wherein said co-extruded polyester film that provides surface A comprises a compound selected from (1) a compound capable of forming a crosslinked structure by application of heat or activated energy rays, (2) a heat-resistant resin having a glass transition temperature (Tg) of not less than 150° C., (3) an acrylic resin, or (4) an amide resin.

19. An optical tape according to claim 18, wherein the content of the compound is 50 to 99.5% by weight based on the weight of the co-extruded polyester film.

20. An optical tape according to claim 17, wherein the thickness of co-extruded polyester film that provides surface A is 0.5 to 49.5 µm.

21. An optical tape according to claim 1, wherein said substrate comprises a polyester base film; a coating layer (A) on the base film which provides said surface A, and a coating layer (B) or co-extruded polyester film (B) on the base film which provides said surface B having a center line average roughness ($Ra^B$) of not more than 0.005 µm.

22. An optical tape according to claim 21, wherein the coating layer (A) comprises a resin binder, a lubricant and a compound selected from (1) a compound capable of forming a crosslinked structure by application of heat or activated energy rays, (2) a heat-resistant resin having a glass transition temperature (Tg) of not less than 150° C., (3) an acrylic resin, or (4) an amide resin.

23. An optical tape according to claim 22, wherein the content of the compound in the coating layer (A) is 50 to 99.5% by weight based on the weight of the coating layer (A).

24. An optical tape according to claim 1, wherein said substrate comprises a polyester base film; a co-extruded polyester film (A) on the base film which provides said surface A and a coating layer (B) or co-extruded polyester film (B) on the base film which provides said surface B having a center line average roughness ($Ra^B$) of not more than 0.005 µm.

25. An optical tape according to claim 24, wherein said co-extruded polyester film (A) is composed of polyesters, a lubricant and a compound selected from (1) a compound capable of forming a crosslinked structure by application of heat or activated energy rays, (2) a heat-resistant resin having a glass transition temperature (Tg) of not less than 150° C., (3) an acrylic resin, or (4) an amide resin.

26. An optical tape according to claim 25, wherein the content of the compound in co-extruded polyester film (A) is 50 to 99.5% by weight based on the weight of the co-extruded polyester film (A).

27. An optical tape according to claim 1, wherein said substrate comprises a polyester base film; a coating layer (A) or co-extruded polyester film (A) on the base film;

a coating layer which provides said surface A formed on the surface of the coating layer (A) or co-extruded polyester film (A); and on the other surface of the base film, a coating layer (B) or co-extruded polyester film (B) which provides said surface B and has a center line average roughness ($Ra^B$) of not more than 0.005 µm.

28. An optical tape according to claim 27, wherein the thickness of the coating layer that provides surface A is 0.0001 to 10 µm.

29. An optical tape according to claim 27, wherein said coating layer that provides surface A comprises a resin binder and a compound selected from (1) a compound capable of forming a crosslinked structure by application of heat or activated energy rays, (2) a heat-resistant resin having a glass transition temperature (Tg) of not less than 150° C., (3) an acrylic resin, or (4) an amide resin.

30. An optical tape according to claim 29, wherein the content of the compound is 50 to 99.5% by weight based on the weight of the coating layer.

31. An optical tape comprising a substrate having surfaces A and B, wherein the substrate comprises a polyester base film having co-extruded polyester films (A) providing surface A and (B) providing surface B on both sides thereof, wherein said surface A has a center line average roughness ($Ra^A$) of 0.006 to 0.5 µm, and wherein said surface B has a center line average roughness ($Ra^B$) of not more than 0.05 µm, wherein the thickness of the co-extruded polyester film (A) is 0.5 to 49.5 µm, the thickness of the polyester base film is 3 to 50 µm, and the thickness of the co-extruded polyester film (B) is 0.5 to 49.5 µm, wherein said substrate has a tensile strength ($F_5$) in the longitudinal direction of not less than 8 kg/mm² and a heat shrinkage factor in the longitudinal direction at a temperature of 100° C. for 30 minutes of less than 5%, wherein a co-extruded polyester film is formed on both of said surface A of the co-extrudedpolyester film (A) and said surface B of the co-extruded polyester film (B); and an optical recording layer formed on said surface B of said substrate.

32. An optical tape according to claim 31, wherein said co-extruded polyester film formed on the surface A and surface B comprises a compound selected from (1) a compound capable of forming a crosslinked structure by application of heat or activated energy rays, (2) a heat-resistant resin having a glass transition temperature (Tg) of not less than 150° C., (3) an acrylic resin, or (4) an amide resin.

33. An optical tape according to claim 32, wherein the content of the compound is 50 to 99.5% by weight based on the weight of the co-extruded polyester film.

34. An optical tape comprising a substrate having surfaces A and B, wherein the substrate comprises
    (i) a polyester base film having a coating layer formed on at least one side thereof, or
    (ii) a polyester base film having a coating layer formed on one side thereof and having a co-extruded polyester film on another side thereof,
  wherein the coating layer provides said surface A,
  wherein said surface A has a center line average roughness ($Ra^A$) of 0.005 to 0.5 μm, and
  wherein said surface B has a center line average roughness ($Ra^B$) of not more than 0.05 μm, and
  wherein said substrate has a tensile strength ($F_5$) in the longitudinal direction of not less than 8 kg/mm² and a heat shrinkage factor in the longitudinal direction when measured at a temperature of 100° C. for 30 minutes of less than 5%,
  wherein the change (ΔH) in film haze of said substrate represented by the following formula is not more than 3%:

$$\Delta H = H_1 - H_0$$

wherein ΔH represents the change in film haze, $H_1$ represents the film haze of the substrate after 30-minute heat-treatment at a temperature of 170° C., and $H_0$ represents the film haze of the substrate at ordinary room temperature before the heat-treatment;
    and an optical recording layer on said surface B of said substrate.

35. An optical tape comprising a substrate having surfaces A and B, wherein the substrate comprises
    (i) a polyester base film having a coating layer formed on one side thereof and having a co-extruded polyester film on another side thereof, or
    (ii) a polyester base film having a co-extruded polyester film on at least one side thereof,
  wherein the co-extruded polyester film provides said surface A,
  wherein said surface A has a center line average roughness ($Ra^A$) of 0.005 to 0.5 μm, and
  wherein said surface B has a center line average roughness ($Ra^B$) of not more than 0.05 μm,
  wherein said substrate has a tensile strength ($F_5$) in the longitudinal direction of not less than 8 kg/mm² and a heat shrinkage factor in the longitudinal direction when measured at a temperature of 100° C. for 30 minutes of less than 5%,
  wherein the change (ΔH) in film haze of said substrate represented by the following formula is not more than 3%:

$$\Delta H = H_1 - H_0$$

wherein ΔH represents the change in film haze, $H_1$ represents the film haze of the substrate after 30-minute heat-treatment at a temperature of 170° C., and $H_0$ represents the film haze of the substrate at ordinary room temperature before the heat-treatment;
    and an optical recording layer on said surface B of said substrate.

36. An optical tape comprising a substrate having surfaces A and B, wherein the substrate comprises
    (i) a polyester film, or
    (ii) a polyester base film having a coating layer formed on at least one side thereof, or
    (iii) a polyester base film having a co-extruded polyester film on at least one side thereof,
  wherein said surface A has a center line average roughness ($Ra^A$) of 0.008 to 0.2 μm, and
  wherein said surface B has a center line average roughness ($Ra^B$) of not more than 0.05 μm,
  wherein said substrate has a tensile strength ($F_5$) in the longitudinal direction of not less than 8 kg/mm² and a heat shrinkage factor in the longitudinal direction when held at a temperature of 100° C. for 30 minutes of less than 5%,
  wherein the change (ΔH) in film haze of the substrate represented by the following formula is not more than 3%:

$$\Delta H = H_1 - H_0$$

wherein ΔH represents the change in film haze, $H_1$ represents the film haze of the substrate after 30-minute heat-treatment at a temperature of 170° C., and $H_0$ represents the film haze of the substrate at ordinary room temperature before the heat-treatment;
    an optical recording layer on said surface B of said substrate.

37. An optical tape comprising a substrate having surfaces A and B, wherein the substrate comprises
    (i) a polyester base film having a coating layer formed on at least one side thereof, or
    (ii) a polyester base film having a coating layer formed on one side thereof and having a co-extruded polyester film on another side thereof,
  wherein the coating layer provides said surface A,
  wherein said surface A has a center line average roughness ($Ra^A$) of 0.005 to 0.5 μm, and
  wherein said surface B has a center line average roughness ($Ra^B$) of not more than 0.005 μm,
  wherein the dynamic coefficient of friction between said surfaces A and B of said substrate is not more than 1.0, and
  wherein said substrate has a tensile strength ($F_5$) in the longitudinal direction of not less than 8 kg/mm² and a heat shrinkage factor in the longitudinal direction when measured at a temperature of 100° C. for 30 minutes of less than 5%,
  wherein the change (ΔH) in film haze of the substrate represented by the following formula is not more than 3%:

$$\Delta H = H_1 - H_0$$

wherein ΔH represents the change in film haze, $H_1$ represents the film haze of the substrate after 30-minute heat-treatment at a temperature of 170° C., and $H_0$ represents the film haze of the substrate at ordinary room temperature before the heat-treatment; and
    an optical recording layer on said surface B of said substrate.

38. An optical tape comprising a substrate having surfaces A and B, wherein the substrate comprises
    (i) a polyester base film having a coating layer formed on at least one side thereof, or (ii) a polyester base film having a co-extruded polyester film on at least one side thereof, wherein the coating layer or co-extruded polyester film on the surface of the polyester base film provides said surface B, wherein said surface A has a center line average roughness ($Ra^A$) of 0.005 to 0.5 μm, and wherein said surface B has a center line average roughness ($Ra^B$) of not more than 0.05 μm, wherein said substrate has a tensile strength ($F_5$) in the longitudinal direction of not less than 8 kg/mm² and a heat shrinkage factor in the longitudinal direction when measured at a temperature of 100° C. for 30 minutes of less than 5%, wherein the change (ΔH) in film haze of the substrate represented by the following formula is not more than 3%:

$$\Delta H = H_1 - H_0$$

wherein ΔH represents the change in film haze, $H_1$ represents the film haze of the substrate after 30-minute heat-treatment at a temperature of 170° C., and $H_0$ represents the film haze of the substrate at ordinary room temperature before the heat-treatment;

and an optical recording layer on said surface B of said substrate.

39. An optical tape comprising a substrate having surfaces A and B, wherein the substrate is selected from the group consisting of:

(i) a polyester film, (ii) a polyester base film having a coating layer formed on at least one side thereof, (iii) a polyester base film having a co-extruded polyester film on at least one side thereof, and (iv) a polyester base film having a co-extruded polyester film on one side thereof and a coating layer formed on other side thereof, wherein said surface A has a center line average roughness ($Ra^A$) of 0.005 to 0.5 μm, and wherein said surface B has a center line average roughness ($Ra^B$) of not more than 0.05 μm, wherein said substrate has a tensile strength ($F_5$) in the longitudinal direction of not less than 8 kg/mm² and a heat shrinkage factor in the longitudinal direction when measured at a temperature of 100° C. for 30 minutes of less than 5%, and wherein the change (ΔH) in film haze of said substrate represented by the following formula is not more than 3%:

$$\Delta H = H_1 - H_0$$

wherein ΔH represents the change in film haze, $H_1$ represents the film haze of the substrate after 30-minute heat-treatment at a temperature of 170° C. and $H_0$ represents the film haze of the substrate at ordinary room temperature before the heat-treatment;

and an optical recording layer on said surface B of said substrate.

40. An optical tape comprising a substrate having surfaces A and B, wherein the substrate is selected from the group consisting of:

(i) a polyester film, (ii) a polyester base film having a coating layer formed on at least one side thereof, (iii) a polyester base film having a co-extruded polyester film on at least one side thereof, and (iv) a polyester base film having a co-extruded polyester film on one side thereof and a coating layer formed on other side thereof, wherein said surface A has a center line average roughness ($Ra^A$) of 0.008 to 0.2 μm, and wherein said surface B has a center line average roughness ($Ra^B$) of not more than 0.05 μm, wherein said substrate has a tensile strength ($F_5$) in the longitudinal direction of not less than 8 kg/mm² and a heat shrinkage factor in the longitudinal direction when measured at a temperature of 100° C. for 30 minutes of less than 5%, wherein the change (ΔH) in film haze of said substrate represented by the following formula is not more than 3%:

$$\Delta H = H_1 - H_0$$

wherein ΔH represents the change in film haze, $H_1$ represents the film haze of the substrate after 30-minute heat-treatment at a temperature of 170° C., and $H_0$ represents the film haze of the substrate at ordinary room temperature before the heat-treatment; and an optical recording layer on said surface B of said substrate.

\* \* \* \* \*